(12) United States Patent
Humpert et al.

(10) Patent No.: US 7,160,072 B2
(45) Date of Patent: Jan. 9, 2007

(54) METHOD OF ATTACHING A FUNCTIONAL ELEMENT; DIE; FUNCTIONAL ELEMENT; COMPONENT ASSEMBLY

(75) Inventors: Richard Humpert, Weilrod (DE); Jiri Babey, Lich (DE); Oliver Diehl, Bad Homburg (DE)

(73) Assignee: Profil Verbindungstechnik GmbH & Co. KG (DE)

( * ) Notice: Subject to any disclaimer, the term of this patent is extended or adjusted under 35 U.S.C. 154(b) by 72 days.

(21) Appl. No.: 10/643,126

(22) Filed: Aug. 18, 2003

(65) Prior Publication Data

US 2005/0025564 A1    Feb. 3, 2005

Related U.S. Application Data

(63) Continuation of application No. 09/418,875, filed on Oct. 15, 1999, now abandoned.

(30) Foreign Application Priority Data

| Jul. 30, 1998 | (DE) | ................. 198 35 923 |
| Oct. 16, 1998 | (DE) | ................. 198 47 838 |
| Oct. 13, 1999 | (EP) | ................. 99120400 |

(51) Int. Cl.
    *F16B 37/04* (2006.01)
(52) U.S. Cl. ............ 411/180; 411/171; 411/417; 411/418; 403/279
(58) Field of Classification Search ............ 411/107, 411/166, 168, 171, 411, 417, 418, 180, 187, 411/188; 403/279, 282
    See application file for complete search history.

(56) References Cited

U.S. PATENT DOCUMENTS

| 1,827,884 | A | * | 10/1931 | Ellison ............ 29/509 |
| 2,342,170 | A | * | 2/1944 | Tinnerman ............ 411/554 |
| 3,800,401 | A | | 4/1974 | Jesevich et al. |
| 3,871,264 | A | | 3/1975 | Hallock |
| 4,064,617 | A | | 12/1977 | Oaks |
| 4,818,165 | A | * | 4/1989 | Shirai ............ 411/178 |
| 4,900,210 | A | * | 2/1990 | Buchanan et al. ............ 411/508 |
| 5,339,509 | A | | 8/1994 | Sawdon et al. |
| 5,407,311 | A | * | 4/1995 | Gross ............ 411/171 |
| 5,528,815 | A | | 6/1996 | Webb |
| 5,697,744 | A | * | 12/1997 | Medal ............ 411/82 |
| 6,108,893 | A | * | 8/2000 | Wojciechowski et al. ............ 29/505 |
| 6,146,072 | A | * | 11/2000 | Müller ............ 411/176 |
| 6,418,609 | B1 | * | 7/2002 | Wojciechowski et al. ............ 29/432.1 |

FOREIGN PATENT DOCUMENTS

| DE | 80 02 790 U1 | 9/1982 |
| DE | 196 47 831 A1 | 5/1998 |

(Continued)

*Primary Examiner*—Daniel P. Stodola
*Assistant Examiner*—Michael P. Ferguson
(74) *Attorney, Agent, or Firm*—Hunton & Williams LLP; Eugene C. Rzucidlo

(57) ABSTRACT

A method of attaching a functional element (10, 210), in particular a fastener element to a sheet metal part (12, 212), optionally in liquid and/or gas-tight manner, is characterized in that the functional element (10, 210, 410) is pressed against the sheet metal part (12, 210, 410) supported by a die (14, 114, 214, 414) and sheet metal material (13) is pressed by means of at least one movably mounted shaped part (16, 116, 216, 416) of the die (14, 114, 214, 414) into an undercut (18, 218, 418) of the functional element (10, 210, 410). The disclosure also claims a die, a functional element, and a component assembly comprising the functional element and a sheet metal part.

3 Claims, 29 Drawing Sheets

FOREIGN PATENT DOCUMENTS

| | | |
|---|---|---|
| EP | 0 171 348 A1 | 2/1986 |
| EP | 0 842 733 A2 | 5/1998 |
| FR | 2 388 636 | 11/1978 |
| FR | 2 388 636 A | 11/1978 |
| GB | 827 245 A | 2/1960 |
| GB | 827 245 A | 3/1960 |
| GB | 1 532 437 A | 11/1978 |

* cited by examiner

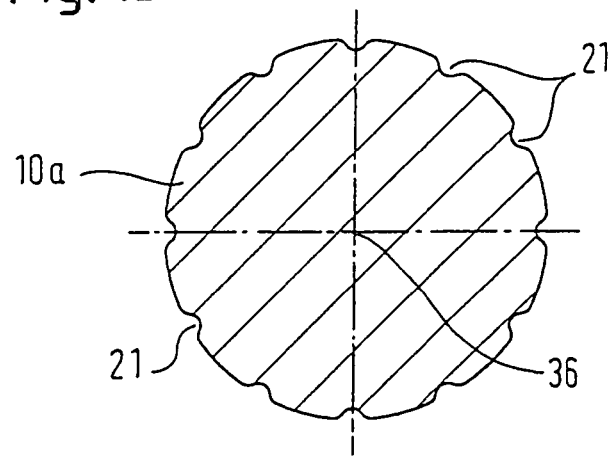
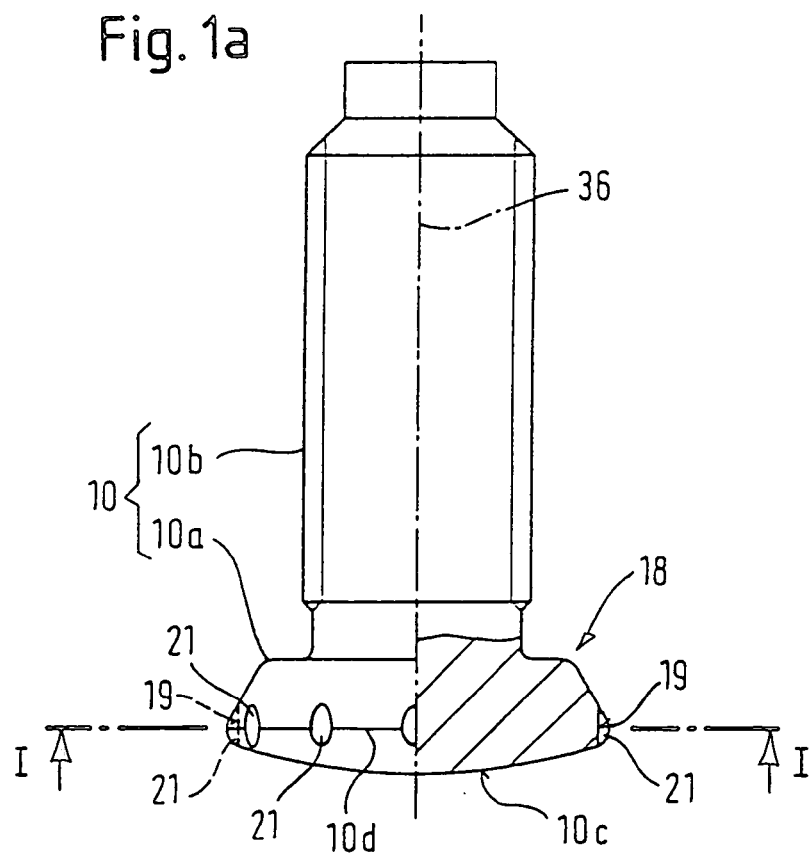
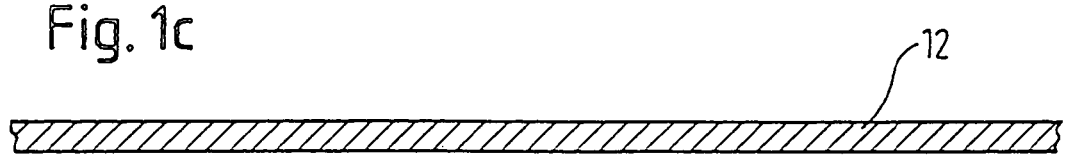

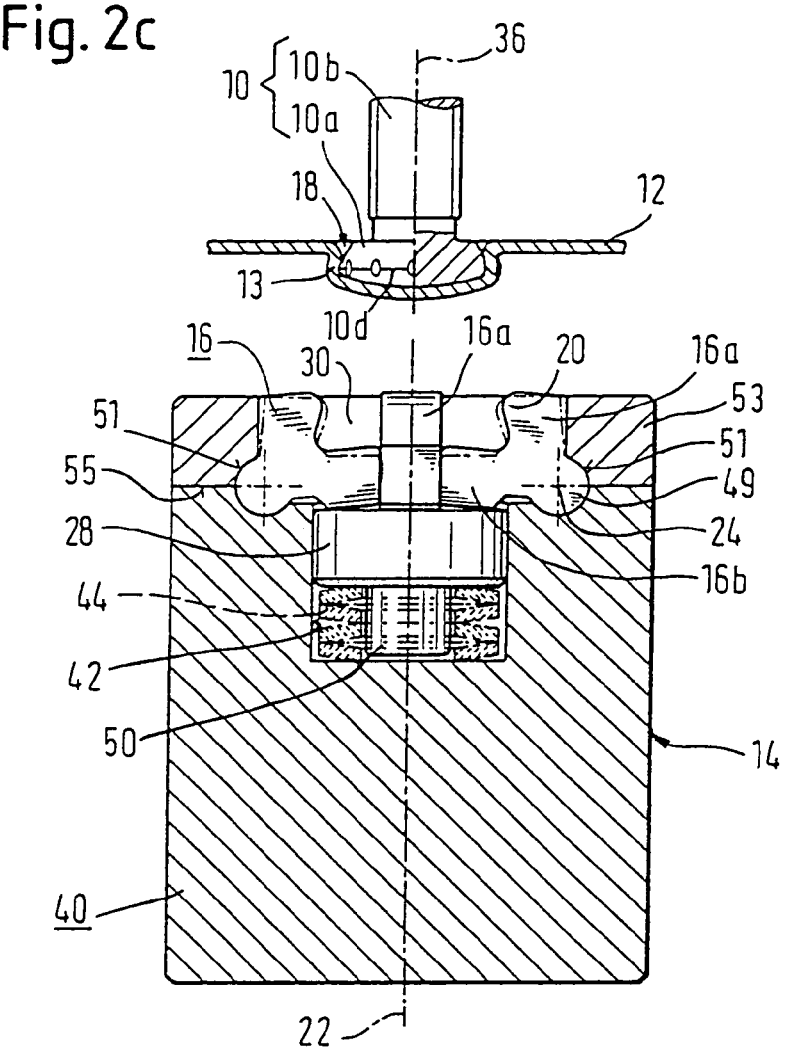
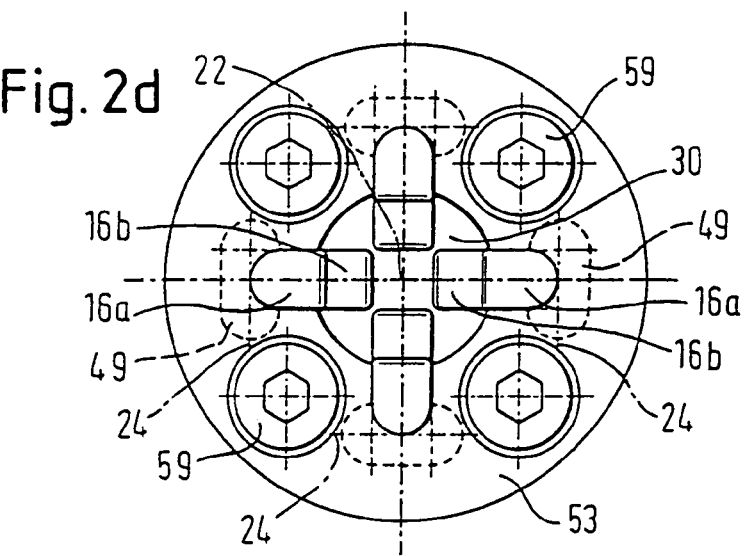

Fig. 3e
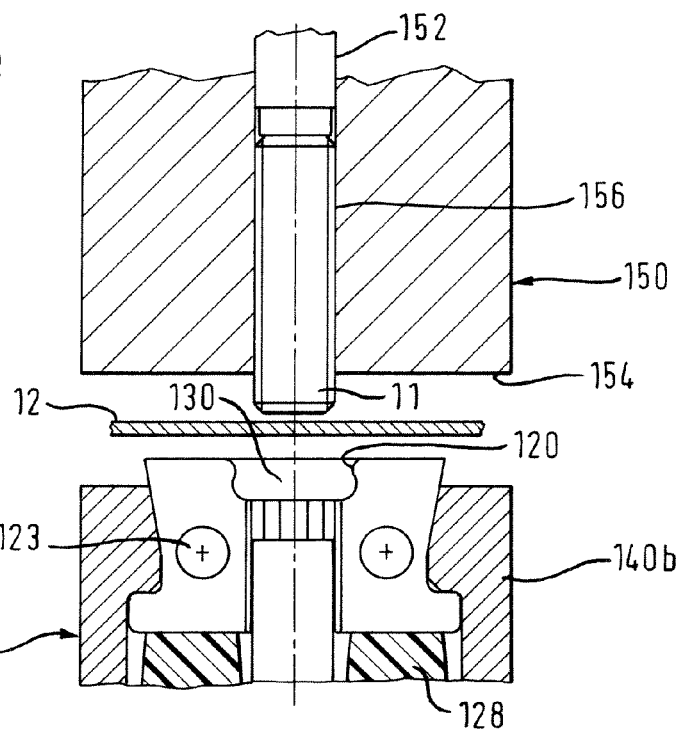
Fig. 3f
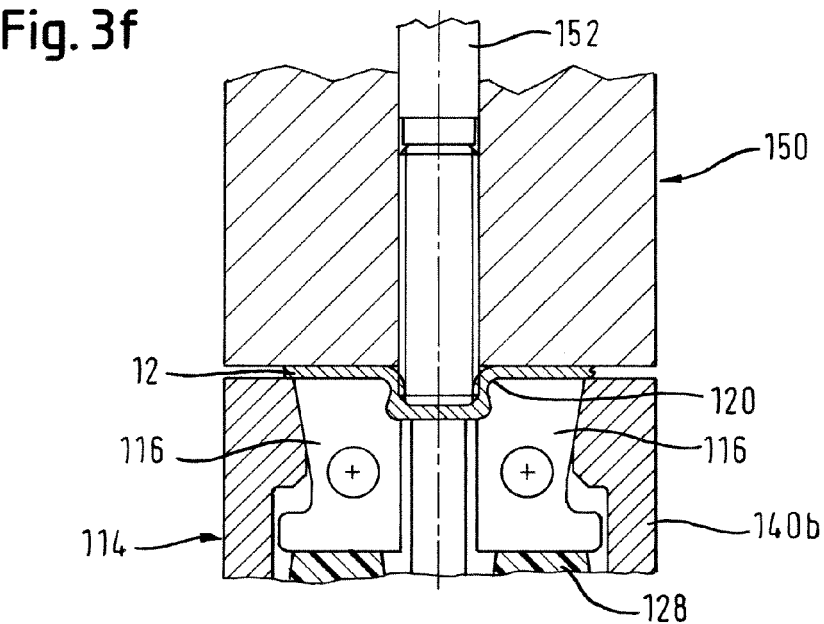
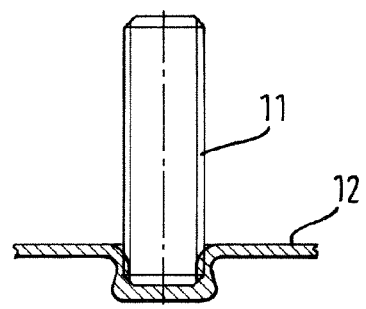

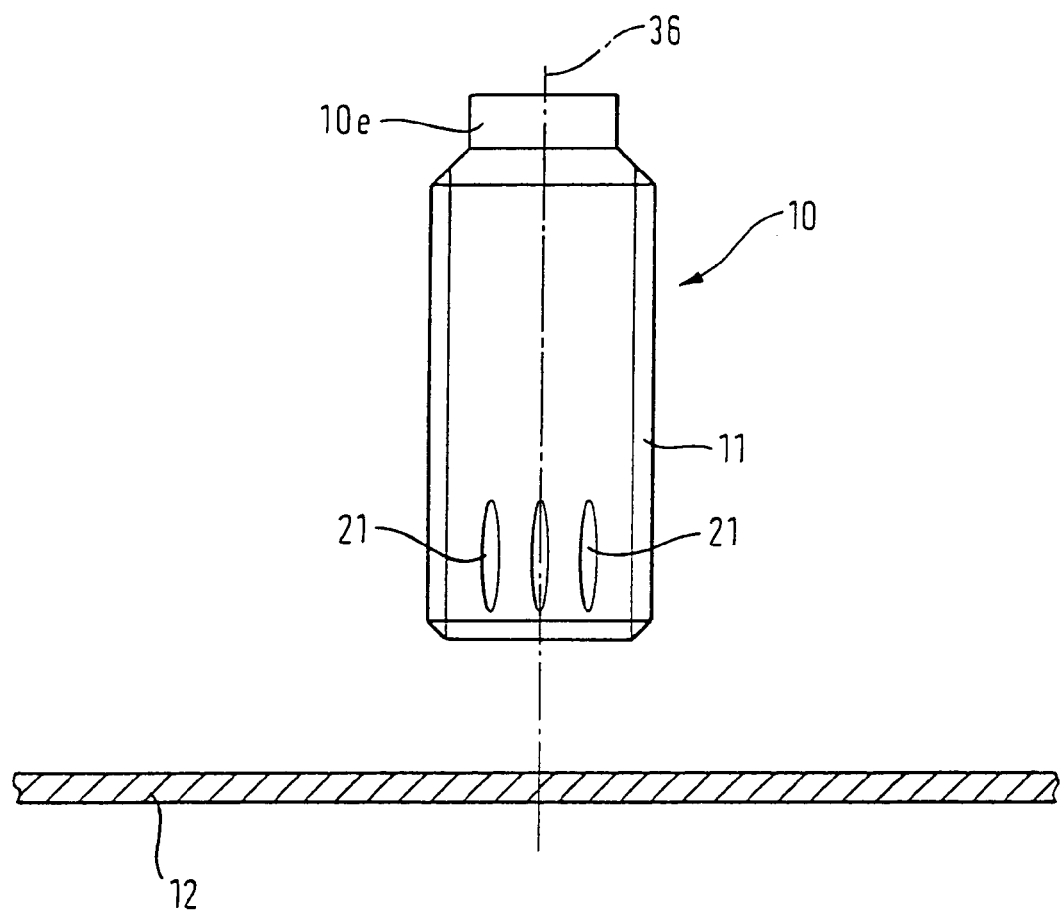

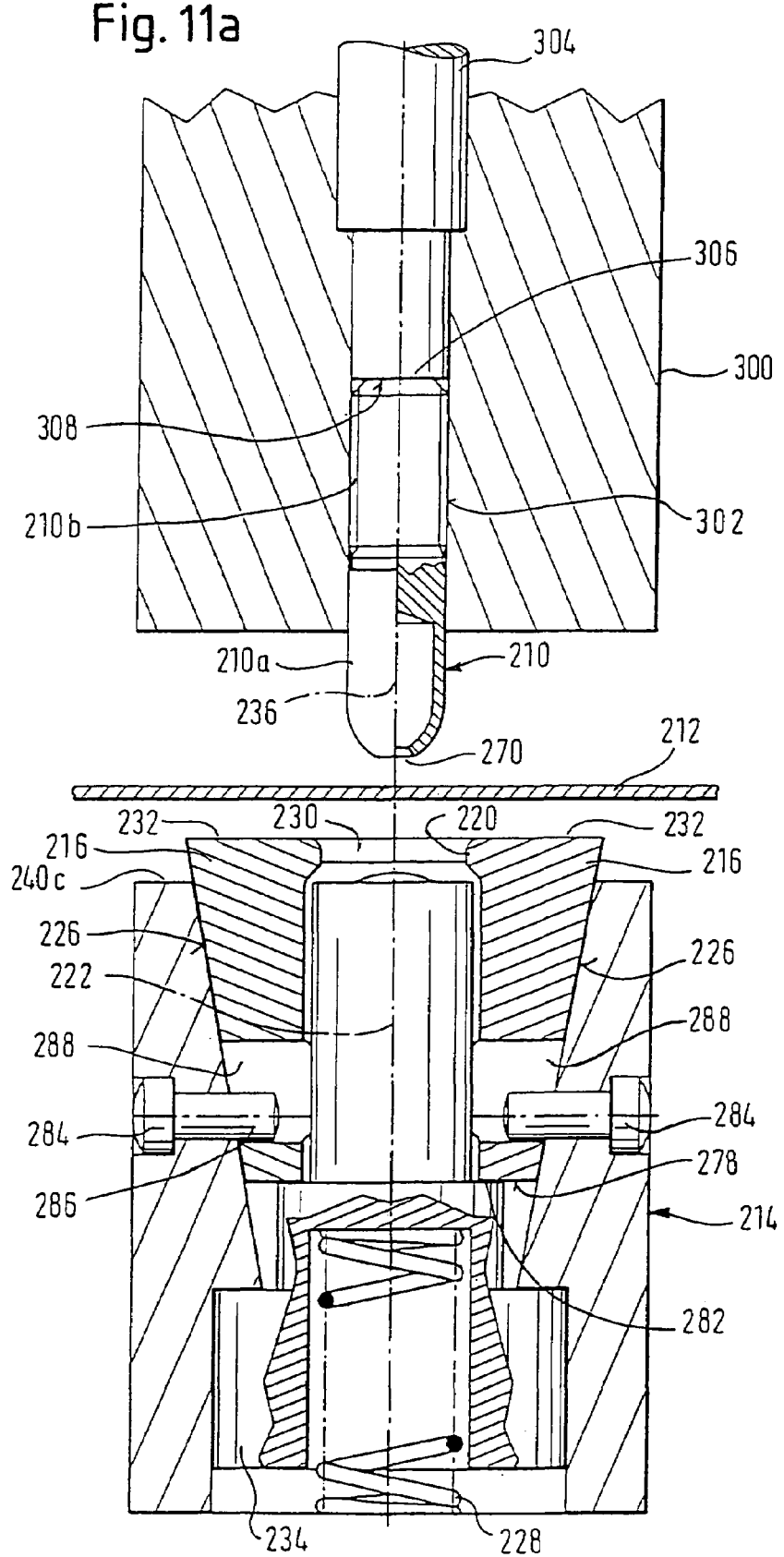

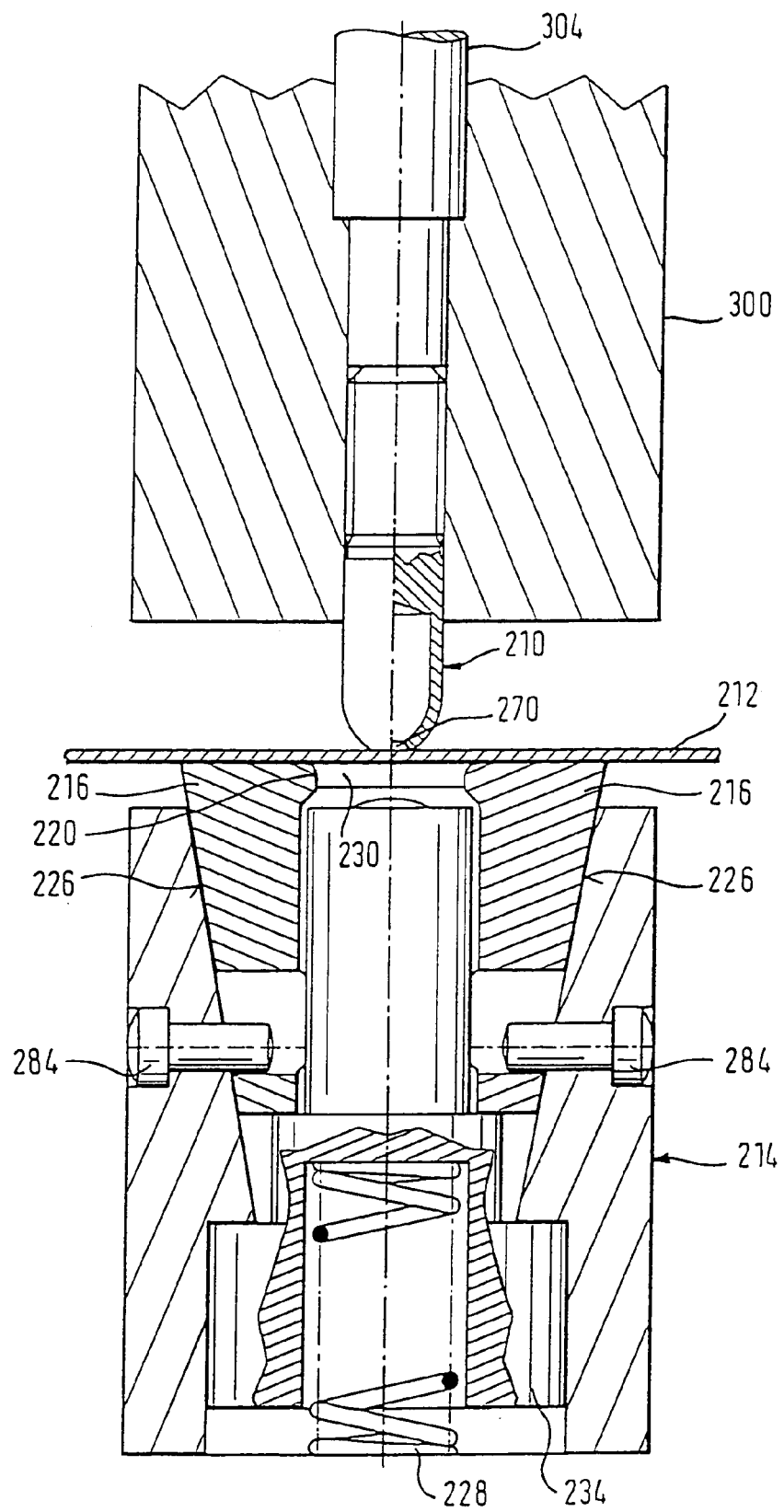

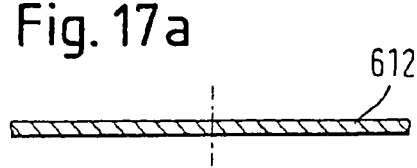
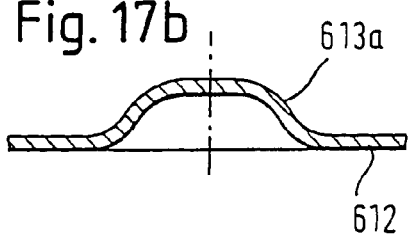
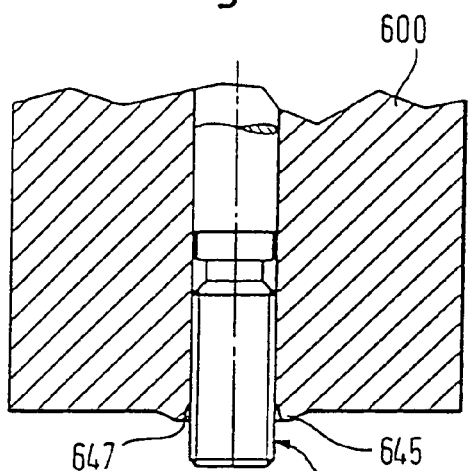
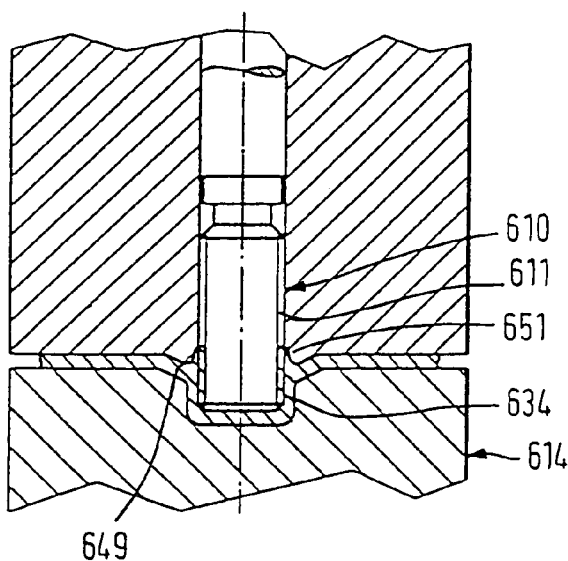
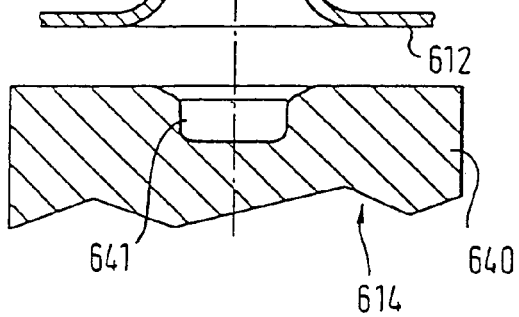
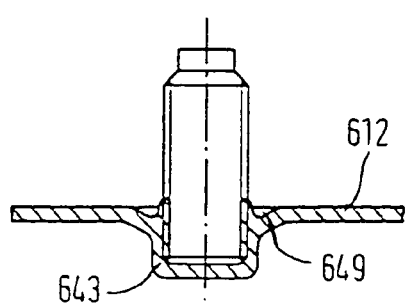

METHOD OF ATTACHING A FUNCTIONAL ELEMENT; DIE; FUNCTIONAL ELEMENT; COMPONENT ASSEMBLY

RELATED APPLICATIONS

This application is a continuation application of U.S. patent application Ser. No. 09/418,875 filed Oct. 15, 1999 now abandoned.

FIELD OF THE INVENTION

The invention relates to a method for the attachment of a functional element, in particular of a fastener element, to a sheet metal part, optionally in liquid and/or gas-tight form.

Furthermore the invention relates to a die and to a functional element which can be used in the method of the invention as well as to a component assembly which can be manufactured through the method of the invention.

BACKGROUND OF THE INVENTION

Functional elements which can also be termed function carriers, such as for example nuts and bolts are attached to sheet metal parts, for example in automobile construction, in order to be able to connect the most diverse components to the sheet metal parts.

A method for the attachment of a functional element to a sheet metal part is known from DE 196 47 831 A1 in which sheet metal material is brought into a hooked engagement with an undercut feature of the functional element by means of a one-piece shaping die against which the functional element is pressed with the sheet metal part lying between them.

Furthermore it is known to connect metal sheets to one another without using additional connection elements by pressing the metal sheets against a die and drawing them by means of a plunger in the direction of a fixed anvil. Moveable lamella of the die which are arranged to the side of the anvil yield and move radially outwardly when the sheet metal part reaches the anvil. In this way a round collar arises which locks the metal sheets to one another.

BRIEF SUMMARY OF THE INVENTION

The object of the invention is to provide a method of the initially named kind and also apparatuses of the initially named kind which ensure a connection between the sheet metal part and the functional element which is easy to manufacture and of high quality.

This object is satisfied in accordance with the invention method-wise in that the functional element is pressed against a sheet metal part supported by a die and sheet metal material is pressed by means of at least one movably mounted shaped part of the die into an undercut of the functional element.

In accordance with the invention the attachment of the functional element to the sheet metal part takes place by a technical shaping and joining method, with it not being necessary, as a result of the provision in accordance with the invention of a movably mounted shaped part of the die button which is able to press sheet material into an undercut of the functional element, to provide the functional element and/or the die with complicated structures which ensure a form-fitted connection or hooked engagement of the functional element with the sheet metal part.

In this way the functional elements, which can be produced in known manner by cold forming or by other favourably priced methods and/or the dies, can be produced at favourable costs.

The invention furthermore makes it possible to intentionally design the movably mounted shaped part of the die, in dependence on the layout of the functional element, and in particular in dependence on the embodiment and/or the position of the undercut of the functional element, and to arrange it such that, on the one hand, the die can be built up as simply as possible and, on the other hand, only the quantity of sheet metal material required for the particular application is pressed into the undercut.

Moreover, in accordance with the invention, the movably mounted shaped part can be formed as a separate component which can for example be exchanged for adaptation to different functional elements or as a result of wear, without the entire die having to be exchanged.

In accordance with a preferred embodiment of the invention the sheet metal part is neither perforated nor holed, at least in the region of the functional element, on its attachment to the sheet metal part.

In this way the sheet metal part is also absolutely liquid and/or gas-tight following the attachment of the functional element and can thus be used in environments in which such characteristics are indispensable.

In accordance with a further preferred embodiment of the invention the shaped part; i.e. the shaped part of the die, can be moved by means of the functional element which is moved in the direction of the longitudinal axis of a die for the attachment to the sheet metal part.

In this way neither a separate drive for the shaped part nor a control means is required to ensure the correct course of movement of the shaped part. On the contrary the invention provides an automatic, self-controlling method which considerably simplifies the attachment of the functional element to the sheet metal part.

In accordance with a further preferred embodiment of the invention the sheet metal part is first pressed into the undercut and preferably brought into engagement with features providing security against rotation after the sheet metal part has been at least partly re-shaped by the functional element moved in the direction of a longitudinal axis of the die for the attachment to the sheet metal part and has in particular being provided with an approximately collar-like or pot-like form.

In this way it is possible to reshape the sheet metal part, for example by a head part of the functional element which is pressed against the sheet metal part in order to form a recess in the sheet metal part for the functional element. Sheet metal material can then be pressed by means of the movably journalled shaped part of the die into the undercut which is, for example, formed at the head part and/or in the region of the transition from the head part to the shaft part of the functional element. In this manner the head part of the functional element is at least partly surrounded by sheet metal material, such that a form-fitted, adequately firm, connection for the transmission of forces acting in the axial direction is provided between the functional element and the sheet metal part.

Further preferred embodiments of the method of the invention and also a die, a functional element and a component assembly in accordance with the invention as well as respectively preferred embodiments of these apparatuses, which likewise each solve the object underlying the invention, are set forth in the claims, in the description and also in the drawing.

BRIEF DESCRIPTION OF THE DRAWINGS

The invention will be described in the following with reference to embodiments and to the drawings, in which are shown:

FIG. 1a an embodiment of a functional element which can be attached by means of the method of the invention to a sheet metal part, in a partly sectioned side view, FIG. 1b the functional element of FIG. 1a in a cross-sectional view along the line I—I, FIG. 1c a schematic representation of a sheet metal part, FIG. 2a an embodiment of a die for carrying out the method of the invention, in a sectioned side view, FIG. 2b the die of FIG. 2a in a plan view, FIG. 2c a preferred variant of the die of FIG. 2a, FIG. 2d the die of FIG. 2c in a plan view, FIG. 3a a further embodiment of a die for carrying out the method of the invention in a sectioned side view which simultaneously shows two different operating positions of the die in a region shown to left of the longitudinal axis and a region shown to the right of the longitudinal axis, FIG. 3b the die of FIG. 3a in a plan view, FIG. 3c a preferred variant of the die of FIG. 3a, FIG. 3d the die of FIG. 3c in a plan view, FIG. 3e a schematic representation of the use of the die of FIG. 3a for the attachment of a functional element realised as a threaded pin and shown in an initial position, FIG. 3f the apparatus of FIG. 3e shown in the end position, FIG. 3g the finished component assembly removed from the apparatus of FIG. 3f, FIG. 4a the functional element of FIGS. 1a and 1b in a state attached to a sheet metal part, FIG. 4b a plan view on the component assembly of FIG. 4a, comprising the functional element and the sheet metal part, FIG. 4c a plan view of a nut element similar to the head part of the functional element of FIGS. 1a and 1b in an illustration corresponding to FIG. 1a, FIG. 4d the element of FIG. 4c in a side view at the left side of the central longitudinal axis and in a radial section on the right side of this axis, FIG. 4e the element of FIGS. 4c and 4d in a state incorporated into a sheet metal part, FIG. 5 a functional element in the form of a threaded pin in accordance with the invention prior to the attachment to a sheet metal part, FIG. 6a the functional element of FIG. 5 formed as a threaded pin in the state attached to the sheet metal part, FIG. 6b a functional element attached to a sheet metal part and formed as a threaded pin accordance with a further embodiment, FIG. 7 a partly sectioned longitudinal view of an element preferred in accordance with the invention and, beneath the element, a schematically illustrated sheet metal part, FIG. 8 the element of FIG. 7 and the sheet metal part after the attachment of the element to the sheet metal part, FIG. 9 a view sectioned in the longitudinal direction of a die for carrying out the connection of FIG. 8, with the die being shown in the open state to the right of the central longitudinal axis and in the closed end state of the joining process to the left of the central axis, FIG. 10 a plan view of the die of FIG. 9 seen in the arrow direction X, with all parts of the die being shown in the initial state at the start of the joining process, FIGS. 11a–k a sequence of drawings which show different stages of the joining process and in each case a sectioned view in the longitudinal direction through the functional element arranged in a setting head and through the die of FIG. 9, FIG. 12a a further tubular functional element which can be riveted in accordance with the invention to a sheet metal part, FIG. 12b a possible initial processing of the sheet metal which can be used with the element of FIG. 12a or of FIG. 7, FIG. 13 a die sectioned in the longitudinal direction similar to that of FIG. 9 for the attachment of the functional element of FIG. 12a or FIG. 7 to the prepared sheet metal part of FIG. 12b, FIG. 14 a side view of the die of FIG. 9, FIG. 15 an illustration partly sectioned in the longitudinal direction of the element of FIG. 12a after attachment to the sheet metal part of FIG. 12b, FIG. 16 a schematic illustration of the die of FIGS. 13 and 14 after the production of the component assembly of FIG. 15 and with illustration of the setting head that is used, and FIGS. 17a to e a series of drawings to illustrate a further possibility of attaching an element formed as a threaded pin to a sheet metal part.

DETAILED DESCRIPTION OF THE INVENTION

Figure 2A:
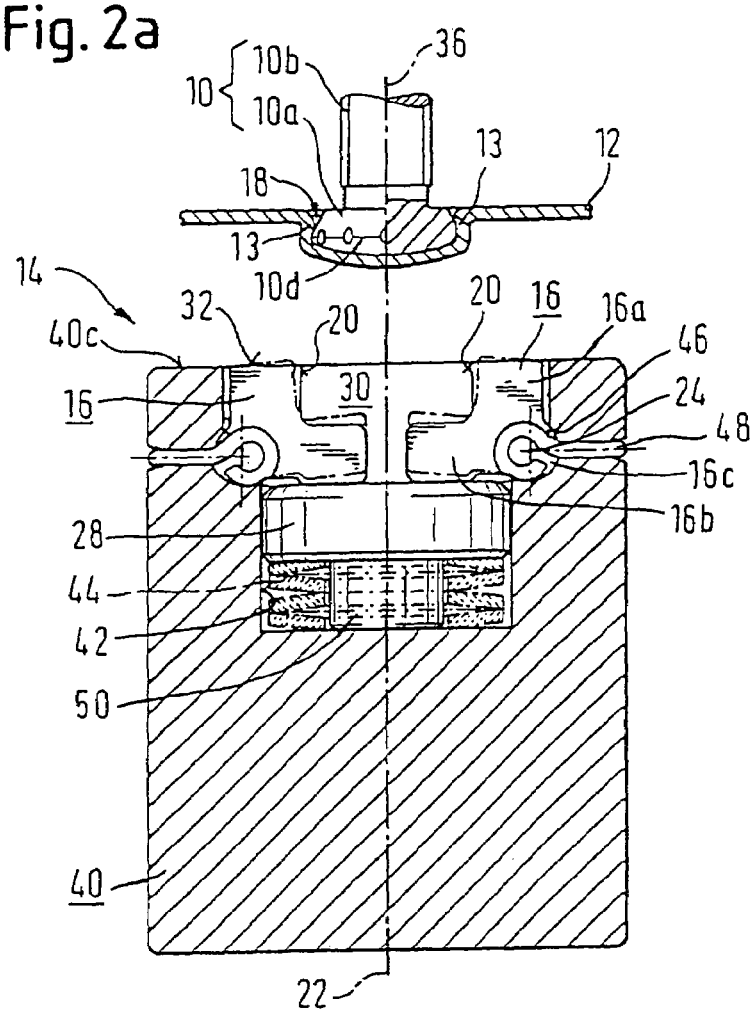

The functional element 10 of FIG. 1a which is intended for attachment to a sheet metal part 12 in accordance with FIG. 1c comprises a head part 10a and a substantially cylindrical shaft part 10b which is connected in one piece to the head part 10a at a flat upper side of the head part 10a extending perpendicular to the longitudinal axis 36 and is provided with a thread. The shaft part 10b can basically be executed as desired in dependence on the respective function which the functional element 10 has to satisfy. By way of example, the shaft part 10b can also be formed free of threads and simply executed as a smooth pin—in deviation from FIG. 1a—and serve as a bearing spigot for components which are to be rotationally mounted. Furthermore the free end of the shaft part lob could also be designed for a latch connection to connection parts which can for example be clipped into place.

The lower side 10c of the head part 10a remote from the shaft part 10b is slightly convexely curved. Starting from a region 10d of maximum diameter the head part 10a tapers in the direction towards the shaft part 10b, so that the cross-section of the head part 10a in a plane containing longitudinal axis 36 has approximately the shape of a trapezium.

The total transition region between the region 10d of maximum diameter of the head part 10a and the shaft part 10b of the functional element 10, i.e. both the surface region extending obliquely towards the longitudinal axis 36 and also the surface region joining it and extending perpendicular to the longitudinal axis 36 represent an undercut 18 in the sense of the invention with which—with a corresponding design of the die—sheet material of a sheet metal part to which the functional element 10 should be attached can be brought into engagement in accordance with the invention.

A plurality of cut-outs 21 which are arranged uniformly distributed in the circumferential direction are provided in the circumferential wall of the head part 10a and serve to receive sheet material of a sheet metal part and thus as features providing security against rotation, They ensure a rotationally fixed connection of the functional element 10 and the sheet metal part.

The cut-outs 21 have—as can be seen from the left-hand non-sectioned part of FIG. 1a—an oval outline at the peripheral wall at the head part 10a and—as can be seen from FIG. 1b—taper in the direction towards the longitudinal axis 36. It can be seen, in particular from the right hand section depart of FIG. 1a, that the cut-outs 21 each form a line 19 at their deepest point in the radial direction which is disposed closest to the longitudinal axis 36 and in each case extends parallel to it, with the boundary line 19 of the cut-out 21 at the leftmost part of FIG. 1a being indicated by a broken line.

The form of the cut-outs 21 results from the formation of the longitudinal grooves which were introduced into the jacket surface of the functional element and can for example be produced in a cold forming or rolling process. The longitudinal axes of these longitudinal grooves or cut-outs 21, which extend parallel to the longitudinal axis 36 of the functional element 10 in the embodiment of FIG. 1a can basically have any desired orientation with respect to the longitudinal axis 36. FIG. 1b shows that the depth of the cut-outs 21 is small in comparison to the diameter of the head part 10a of the functional element 10. Basically however the number, the type and manner of the arrangement, the specific design and also in particular the radial depth as well as the shape of the cut-outs 21 can be varied in dependence on the respective application.

Figure 2B:
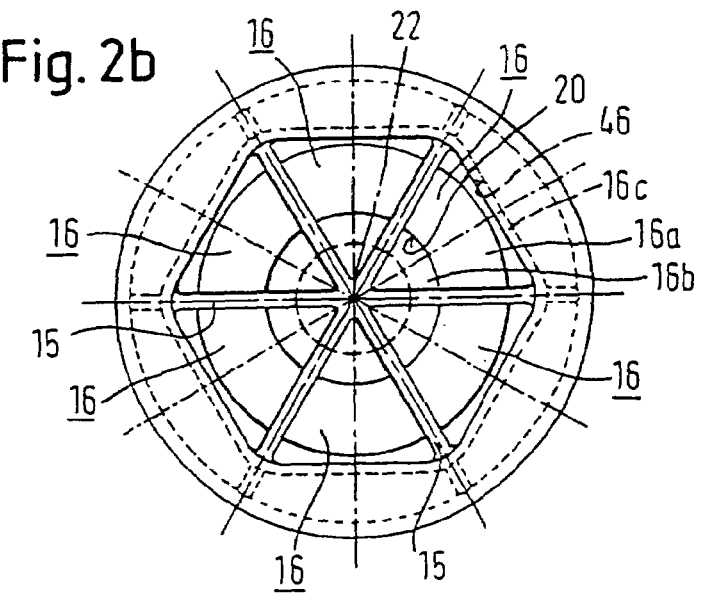

FIGS. 2a and 2b shown an embodiment of a die 14 having a longitudinal axis 22. In FIG. 2a the functional element 10 already attached to the sheet metal part 12 is partly shown above the die 14. The functional element 10 and the sheet metal part 12 form in this state a component assembly which can be produced by means of the die 14 which will be described in the following and which is shown in enlarged form in FIG. 4.

The die 14 of FIGS. 2a and 2b includes a block 40 in which a stepped recess 42 is formed. In the lower region of the recess 42 having a smaller, free, inner cross-sectional area there is arranged a plate or disk-like support element 28 which rests on a spring member 44 and which is supported via the spring member 44 on the base of the recess 42. A maximum depth of inward movement of the support element 28 is fixed by an abutment element 50. The spring member 44 preferably comprises one or more plate springs, can however also be executed as an elastically deformable block, for example of polyurethane or in another manner.

In the upper region of the recess 42 having a larger free inner cross-section there are arranged—as can be seen from FIG. 2—six shaped parts 16 of identical design which each have an approximately triangular cross-section in a plane perpendicular to the longitudinal axis and are arranged in cake-like manner around the longitudinal axis 22.

Each shaped part 16 is formed as a approximately right angled, rotationally mounted lever and includes an actuating arm 16b extending approximately perpendicular to the longitudinal axis 22 via which it can cooperate with the support element 28, and also an engagement arm 16 extending approximately parallel to the longitudinal axis 22, with the free end of the engagement arm 16 having a bead-like projection 20 in a region confronting the longitudinal axis 22 which serves, in a manner to be described, to press sheet metal material 13 of the sheet metal part 12 into an undercut 18 of the functional element 10.

The sides of the engagement arms 16a confronting the longitudinal axis 22 and the sides of the actuating arm 16b facing away from the support element 28 bound a substantially cylindrical shaping space 30 of the die or die button 14.

In the transition region between the rear side of the engagement arms 16a and the lower side of the actuating arm 16b each shaped part 16 is provided with a cut-out 16c in the form of a half cylinder by which the shaped part 16 stands in engagement with holding elements 48 formed, for example, of wire or sheet metal and the free ends of which are respectively bent into a shape complementary to the cut-out 16.

The material of the shaped part 16 bounding the cut-out 16c extends over an angular range of more than 180°, so that the bent free ends of the holding arms 48 which are pushed sideways into the cut-out 16c cannot be drawn in the longitudinal direction of the holding elements 48 out of the shaped part 16.

The free end of the holding elements 48 thus each serve as a respective axis of rotation 24 for the bearing regions 46 fixing the shaped part on which the shaped part 16 are each respectively rotatably journalled.

Furthermore the holding elements 48 are so connected with the die 14 in respective regions surrounding the shaped parts 16 that the axes of rotation of the shaped parts 16 are each held in a defined fixed spacing from the longitudinal axis 22 of the die 14 and thus the shaped parts are prevented from shifting in the direction towards the longitudinal axis 22.

The shaped parts 16 are consequently each rotatable about the axis of rotation 24 which extends perpendicular to the longitudinal axis 22 of the die 14 in the region of the cut-out 16c and of the bent-over free ends of the holding element 48 forming the bearing region 46.

The shaped parts 16 which are arranged in the manner of pieces of cake around the longitudinal axis 22 of the die 14, and which each have the cross-section of an equilateral triangle can in particular be seen at the level of the cut-outs 16c. The actuating arms 16b of the shaped part 16 converge to a point in a direction of the longitudinal axis 22. The engagement arms 16a of the shaped part 16 are curved around the longitudinal axis 22 of the die in order to form the cylindrical shaping space 30. The projections 20 formed at the free ends of the engagement arms 16a thus lie in a circle around the longitudinal axis 22. A gap-like intermediate space 15 is present between each pair of mutually confronting sides of the mould part 16.

A functional element 10 is attached to a sheet metal part 12 in accordance with the method of the invention as follows by means of the die 14 of the invention in the embodiment of FIGS. 2a and 2b:

In a starting position shown in chain-dotted lines in FIG. 2a the shaped parts 16 are each rotated about the axis of rotation 24 by the support element 28 which pushes from below against the actuating arms 16b, so that in each case the engagement arm 16a contacts the boundary wall of the recess 42 in the region of its free end and the upwardly pointing end face of the shaped part 16 extends slightly obliquely to the end face of the region of the die bounding the recess 42, which extends perpendicular to the longitudinal axis 22.

After a flat sheet metal part 12 has been laid on the die 14 a functional element 10 is pressed from above against the sheet metal part 12 by a non-illustrated setting head and is subsequently pressed into the shaping space 30 and shaped in pot-like manner.

The torque which is exerted by the forces which act on the shaped parts 16, via the sheet metal part 12 contacting the end faces of the engagement arms 16a which form a contact surface, is not sufficient to rotate the shaped parts 16, since these forces are partly taken up by the bearing regions 46 on which the shaped parts 16 are supported and, on the other hand, are partly compensated by the support element 28 which acts on the shaped parts in the opposite direction.

The shaped parts 16 are consequently first tilted as a result of an adequately high torque into the end position shown in continuous lines in FIG. 2a when the functional element 10 has been moved into the shaping space 30 sufficiently far that it loads the actuating arms 16b through the intermediary of the sheet metal part 12 and presses the sheet metal part downwardly against the resetting force of the spring member 44 of the support element 28.

The free ends of the engagement arms 16a are subsequently moved in the direction of the longitudinal axis 22 so that they enter into engagement with the sheet material 13 of the sheet metal part 12 surrounding the head part 10a of the functional element 10 and thus press the sheet material 13 against the peripheral wall of the head part 10a and into the cut-outs 21 formed therein.

The projections 20 respectively formed at the free ends of the engagement arms 16a additionally ensure that sheet metal material 13 is pressed against the surface region of the head part 10a extending obliquely towards the longitudinal axis 36 and thus, as viewed from the underside of the head part 10a, behind the region 10d of maximum diameter and in this manner into the undercut 18.

During the last part of the downward movement of the functional element 10 in the direction of the longitudinal axis 22, i.e. up to the abutment of the support element 28 at the abutment element 50, the sheet metal part 12 is thus further shaped and simultaneously the head part 10a is connected or hooked in form-fitted manner to the sheet metal part 12 in such a way that the functional element 10 is rotationally securely fixed to the sheet metal part as a result of the cut-outs 21 and is fixed to the sheet metal part in the axial direction as a result of the undercut 18.

The component assembly produced in the above-described manner, i.e. the functional element 10 in the state attached to the sheet metal part 12 and removed from the shaping space 30 of the die 14, is illustrated in FIG. 2a above the die 14 and—enlarged—in FIG. 4, in which the head part 10a is arranged in a pot-like recess of the sheet metal part 12 produced by the shaping process, with the sheet metal part 13 pressed by means of the projections 20 of the shaped parts 16 into the undercut 18 engaging around the region 10d of maximum diameter and in this manner holding the functional element 10 at the sheet metal part 12.

The FIGS. 2c and 2d show the embodiment of the die of FIGS. 2a and 2b preferred in practice. Parts in the embodiments of FIGS. 2c and 2d which correspond to parts of the die of FIGS. 2a and 2b are characterised by the same reference numerals. The description of the corresponding components with reference to FIGS. 2a and 2b also applies to this preferred embodiment in accordance with FIGS. 2c and 2d provided nothing to the contrary is stated.

In distinction to the die of FIGS. 2a and 2b the die of FIGS. 2c and 2d is characterised by the fact that instead of six shaped parts 16 here only four are present, with it however also being possible to realize the principle with fewer shaped parts.

Instead of using separate holding elements 48 the shaped parts 16 of the embodiment of FIGS. 2c and 2d are equipped with part-cylindrical regions 49 which are accommodated in corresponding part-cylindrical mounts 51 of the die 14. In the embodiment of FIGS. 2c and 2d the body part 40 of the die 14 is provided with a cover cap 53 which is connected to the body part 40 via a partition surface 55 by means of screws 59 (which can only be seen in FIG. 2d), with one part of the part cylindrical recess 51 for the pivotal mounting of each shaped part 16 being formed in the lower part of the die and one part being formed in the plate 53 screwed thereto by the four screws 59 arranged in the regions between each pair of neighbouring shaped parts 16. The angular extent of the cut-out 51 about the respective pivot axis 24 of the respective shaped part 16 amounts to somewhat more than 180°, so that the shaped part 16 are held in form-fitted manner between the plate 53 and the lower part 40 of the die 14. This embodiment is easier to manufacture than the embodiment of FIGS. 2a and 2b and is in addition also more stable. The functional description for the embodiment of FIGS. 2a and 2b given above applies in precise in the same manner to the embodiment of FIGS. 2c and 2d. The only difference lies in the fact that the shaping space 30 in the embodiment of FIGS. 2c and 2d is not formed on all sides by the shaped parts 16, so that the sheet metal is not pressed around the entire periphery of the head part 10a of the functional element 10 into the undercut 18 but rather principally at the four positions at which the engagement arms 16a come into use. This is however completely sufficient in order to produce a high quality form-fitted connection in the region of the undercut 18 at the corresponding positions, particularly since the sheet metal material is also drawn as it were into the undercut 18 in the regions between the engagement arms 16a.

It should once again be emphasized that although the symmetrical arrangement with four engagement arms represents the preferred embodiment it should also be entirely possible to operate with three, two or indeed with only one engagement arm.

Figure 3A:
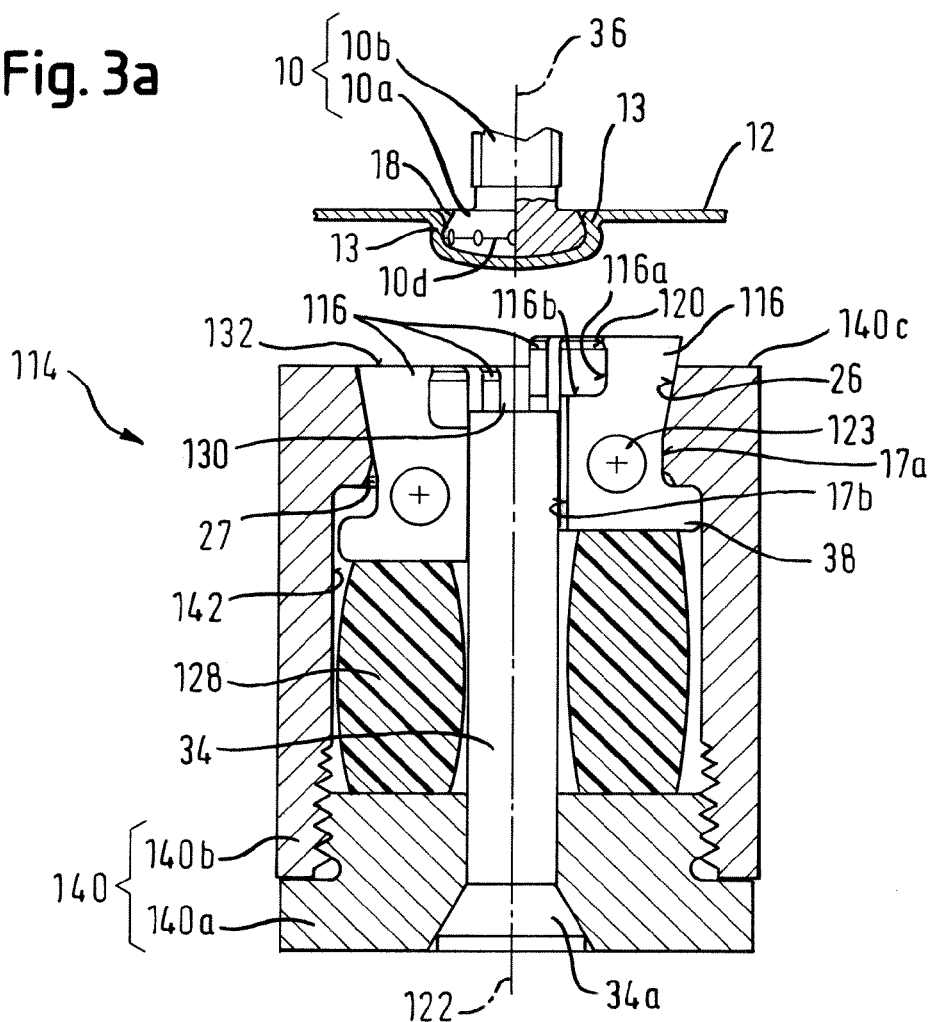
Figure 3B:
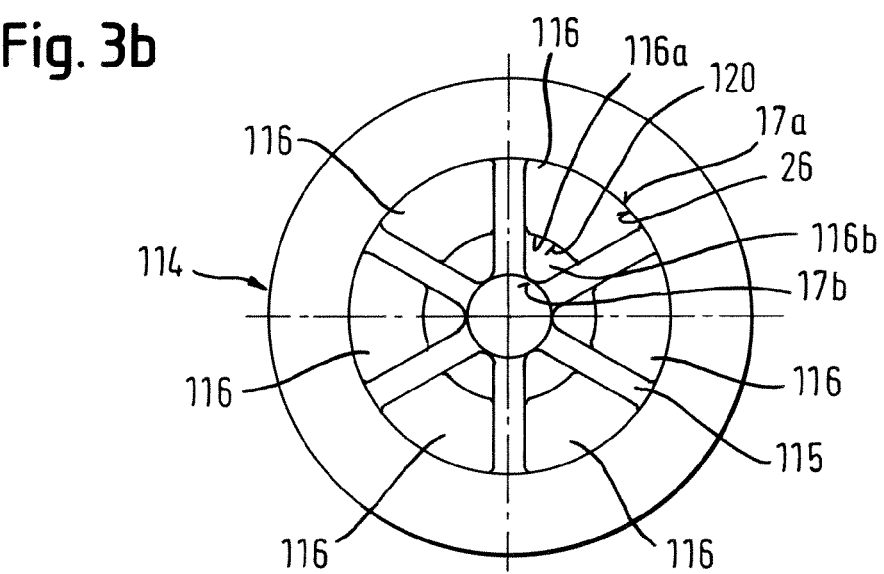

The die 114 in accordance with the embodiment of the invention shown in FIGS. 3a and 3b has, in distinction to the embodiment of the invention described with respect to FIGS. 2a and 2b, shaped parts 116 which can be shifted in the axial direction and which are arranged in a recess 142 formed in a two-part block 140 distributed in the manner of pieces of cake around a cylindrical abutment element 34 of the die 114—as shown in FIG. 3b. Gap-like intermediate spaces 115 are provided between the shaped parts 116. The block 140 includes a base part 140a and a wall part 140b which are screwed together or which can be releasably connected together in a different way or means for the assembly and dismantling of the die 114.

The upper end face of the abutment element 34, of which the longitudinal axis coincides with the longitudinal axis 122 of the die 114, forms the central part of the base of a substantially cylindrical shaping space 130 which is in other respects bounded by the shaped parts 116. A truncated cone-like foot section 34a of the abutment element 34 is arranged in a correspondingly shaped recess in the base part 40a of the block 40 of the die 114, so that the abutment element 34 can only be introduced from below into the recess 142 to such an extent that the lower end face of the abutment element 34 of FIG. 3a terminates flush with the lower side of the base part 40a.

The shaped parts 116 each include an actuating surface 116b extending perpendicular to the longitudinal axis 122 and an engagement surface 116a extending parallel to the longitudinal axis 122 which, together with the upper end face of the abutment element 34, bound the shaping space 130. In the region of the upper free end of the shaped parts 116 the engagement surfaces 116a are each provided with a bead-like projection 120 facing towards the longitudinal axis 122 with which sheet metal material 13 of the sheet metal part 12 can be pressed in a manner still to be described into an undercut 18 of the functional element 10.

Starting from an end face of the die 114 forming an abutment surface 132 for a sheet metal part 12 the recess 142 first tapers in such a way that its boundary wall extends conically towards the longitudinal axis 122 and forms a shaped surface 26 before broadening into a cylindrical region with a boundary wall parallel to the longitudinal axis 122, so that a ring step 27 is present.

The shaped parts 116 each lie with an outer surface 17a remote from the abutment element 34 against the shaped surface 26 which converges obliquely towards the abutment element 34 and are supported with their underside extending perpendicular to the longitudinal axis 122 of the die 114 on a support element 128. The support element 128, which is for example manufactured of polyurethane, is elastically deformable and formed as a one-piece hollow cylinder surrounding the abutment element 34.

An inner surface 17b of each shaped part 116 extends parallel to the longitudinal axis 122 of the die 114 and thus parallel to the outer wall of the abutment element 34.

In the region of the transition between the lower side and its rear side remote from the longitudinal axis 122 the shaped parts 116 are each provided with a ring shoulder 38, with which the shaped parts 116 can be pressed into a starting position, which is shown in the right part of FIG. 3a, in each case by the support element 128 pressing it against the ring step 27 in the transition region between the cylindrical and conical regions of the recess 142.

In this starting position the inner surfaces 17b of the shaped part 116 are each spaced from the abutment element 34, whereas, in an end position, which is shown in the left hand part of FIG. 3a, the inner surfaces 17b of the shaped parts 116 which are moved against the resetting force of the compressed support element 128 in the direction of the base part 40a each contact the outer wall of the abutment element 34.

In FIG. 3b the shaped parts 116 are shown in an end position in accordance with the left hand part of FIG. 3a with inner surfaces 17b contacting the outer wall of the abutment element 34.

In accordance with the method of the invention a functional element 10 is attached as follows to a sheet metal part by means of the die 114 of the invention in the embodiment of FIGS. 3a and 3b.

First of all a flat sheet metal part 12 is placed onto the support surface 132 of the die 114 formed by the end faces of the shaped parts 116 located in the starting position, in accordance with the right hand part of FIG. 3a. A functional element 10 held by a non-illustrated setting head is subsequently pressed from above against the sheet metal part 12 in order to press the latter into the shaping space 130 and to shape it in pot-like manner.

When the functional element 10 has been introduced sufficiently far into the shaping space 130 that it enters through the intermediary of the sheet metal part 12 into contact with the actuating surfaces 116b of the shaped parts 116, and thereby presses the shaped parts 116 against the resetting force of the support element 128 downwardly, the shaped parts 116 slide with their outer surfaces 17a along the oblique shaped surface 26, and indeed simultaneously downwardly and towards the abutment element 34, until the inner surfaces 17b of the shaped parts 116 come into contact with the outer wall of the abutment element 34.

In this arrangement the sheet metal material 13 of the sheet metal part 12, which already surrounds the head part 10a of the functional element 10 as a result of the shaping process, is pressed against the peripheral wall of the head part 10a and into the cut-outs 21 formed therein.

The projections 120 which are respectively formed on the engagement surfaces 116a of the shaped parts 116 press additional sheet metal material 13 during the last part of the downward movement of the functional element 10 against the surface region of the head part 10a extending obliquely towards the longitudinal axis 36 and thus—as seen from the lower side 10c of the head part 10a—behind the region 10d of maximum diameter, i.e. into the undercut 18 of the functional element 10.

As a consequence the functional element 10 is connected or hooked in form-fitted manner to the sheet metal part 12 and is attached in a rotationally secure manner to the sheet metal part 12 as a result of the cut-outs 21, and in the axial direction as a result of the undercut 18. In the above described manner a component assembly is produced which is partly shown in FIG. 3a above the die 114 and also—in enlarged form—in FIG. 4a.

Figure 3C:
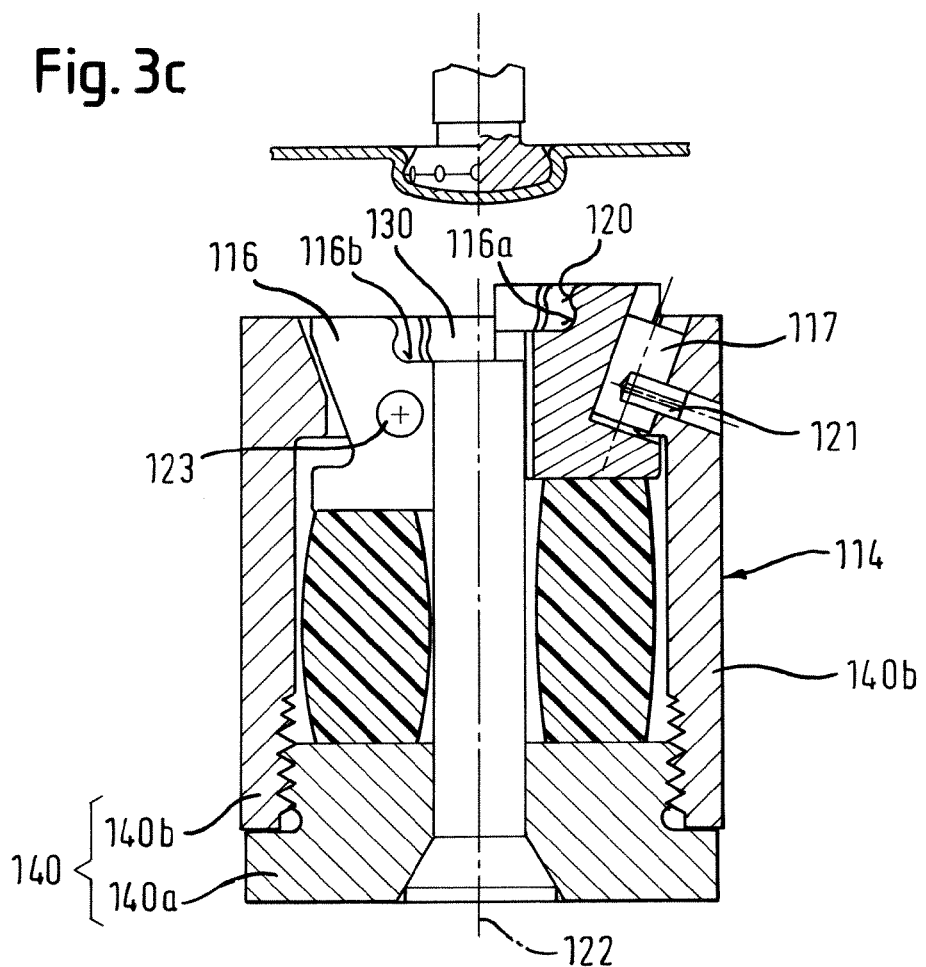
Figure 3D:
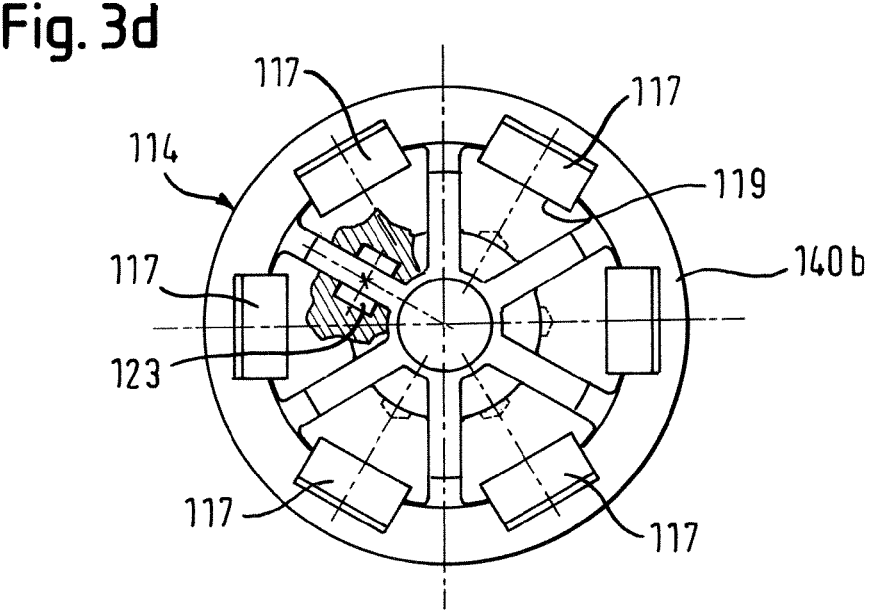

The FIGS. 3c and 3d show the embodiment of the die of FIGS. 3a and 3b which is preferred in practice. Parts in the embodiment of FIGS. 3c and 3d which correspond to parts of the die of FIGS. 3a and 3b are characterized with the same reference numerals. The description of the corresponding components with reference to FIGS. 3a and 3b also applies for this preferred embodiment in accordance with FIGS. 3c and 3d, insofar as nothing is stated to the contrary.

The differences between the preferred die 114 of FIGS. 3c and 3d and the very similar die of FIGS. 3a and 3b lies essentially in the detail arrangement and detail guidance of the shaped parts 116.

Whereas, in the embodiment of FIGS. 3a and 3b, the shaped parts 116 slide along a conical shaped surface 26 during the shaping movement of the sheet metal part, a separate hardened guide element or prism 117 is provided for each shaped part 116 of the embodiment of FIGS. 3c and 3d. Each prism 117 engages in a correspondingly machined groove 117 of the respective shaped part 116 and is secured by means of a threaded pin 121 relative to the upper part 140b of the die. Through the form matched reception of each guide block or prism 117 in the respective shaped part 116 the angular position of the respective shaped part 116 about the central longitudinal axis 122 of the die 114 is uniquely fixed, so that no jamming can occur in operation.

This stable guidance of the individual shaped parts 116 also ensures unambiguous conditions are present in the region of the respective synchronizing pins 123 which are of cylindrical shape and which are arranged in corresponding mutually confronting recesses of two neighbouring shaped parts 116 in each case. The total of six synchronising pins 123 which are present ensure that all six mould parts 116 simultaneously move in synchronised manner in the axial direction 122 and thus prevent an undesired canting of the element or of the sheet metal part during the shaping process.

It should also be noted here that the provision of six shaped parts 116 is not absolutely essential. The design could be realized equally well with four or three or fewer shaped parts 116.

The description of the operation of the die of FIGS. 3a and 3b applies in the same way for the preferred embodiment of FIGS. 3c and 3d which is brought to expression by the use of corresponding reference numerals in the respective figures.

The FIGS. 3e, 3f and 3g show in other respects the use of a die in accordance with FIGS. 3a and 3b for the attachment of a functional element in the form of the threaded pin without any special head shape. In this way the sequence of operations with the die in accordance with FIGS. 3a and 3b or 3c and 3d is once again made clear and, on the other hand, expression is also given to the fact that this die can be used with different functional elements and is not restricted to use with a functional element in accordance with FIGS. 1a and 1b.

As already mentioned the functional element in the embodiment of FIGS. 3e to 3g is a threaded pin, for example as shown in FIG. 5. This functional element has the special advantage that it is extremely favourably priced and can for example be produced in a continuously running rolling process from bar or wire material. The functional element consists here ultimately of a cylindrical part having a thread, with the threaded pin optionally having a collar 10e at one end, for example at the free end of FIG. 3g and optionally being provided at the lower end in FIG. 3g with features such as 21 in FIG. 5 to provide security against rotation, with it also being possible to produce these shaped features in the context of a continuous rolling process.

Basically the insertion process in accordance with FIGS. 3a and 3f has already been specified in detail in conjunction with the manner of operation of the die of FIGS. 3a and 3b. Simply for the sake of emphasis it is made clear here that the part 150 is a setting head with a plunger 152, and that the setting head 150 has an end face 154 acting as a hold-down element for the sheet metal and a central passage 156 for receiving the threaded pin and for guiding the plunger 152. The setting head 150 is for example located on an intermediate plate of a press or on the upper tool of a press, whereas the die 114 is located in the lower tool or in the intermediate plate respectively. Inverse arrangements are also possible, i.e. with the die 114 above the setting head 150, so that then, for example, the die 114 could be secured to the upper tool of the press or to an intermediate plate of the press, whereas the setting head 150 will then be positioned on the intermediate plate or in the lower tool of the press respectively. The setting head and the die 114 could also be used outside of a press, for example they could be actuated by a robot.

In the state shown in FIG. 3e the conceptual press has been opened so that the sheet metal part 12 can be introduced between the end face of the die 114 and the lower end faced of the threaded pin 11. On closing of the press the end face 154 of the setting head 150 is first pressed against the sheet metal part 12 so that the latter is pressed and immovably held against the upper end face of the shaped part 116. During the further closing movement of the press the plunger 152 now presses the lower end face of the threaded pin 11 in FIG. 3e against the sheet metal part 12 and shapes this into the shaping chamber 130, initially without the shaped parts 116 deflecting rearwardly relative to the die 114. When however the end face of the threaded pin 11 presses the sheet metal part 12 against the actuating surfaces 116b of the sheet metal parts 116 the latter are pressed from the position in FIG. 3e into the position of FIG. 3f, i.e. the shaped parts 116 now move rearwardly relative to the body 140 of the die 114. The projections 120 press the sheet material into the threads of the lower end of the threaded stift 11 forming the undercut, and also into any features providing security against rotation which may be present, and hereby form a form-fitted connection between the threaded pin and the sheet metal part. After the opening of the press the component assembly in accordance with FIG. 3 consisting of the sheet metal part 12 with the threaded pin 11 held in form-fitted manner therein, but not penetrating the sheet metal part 12, can be removed from the press.

Figure 4A:
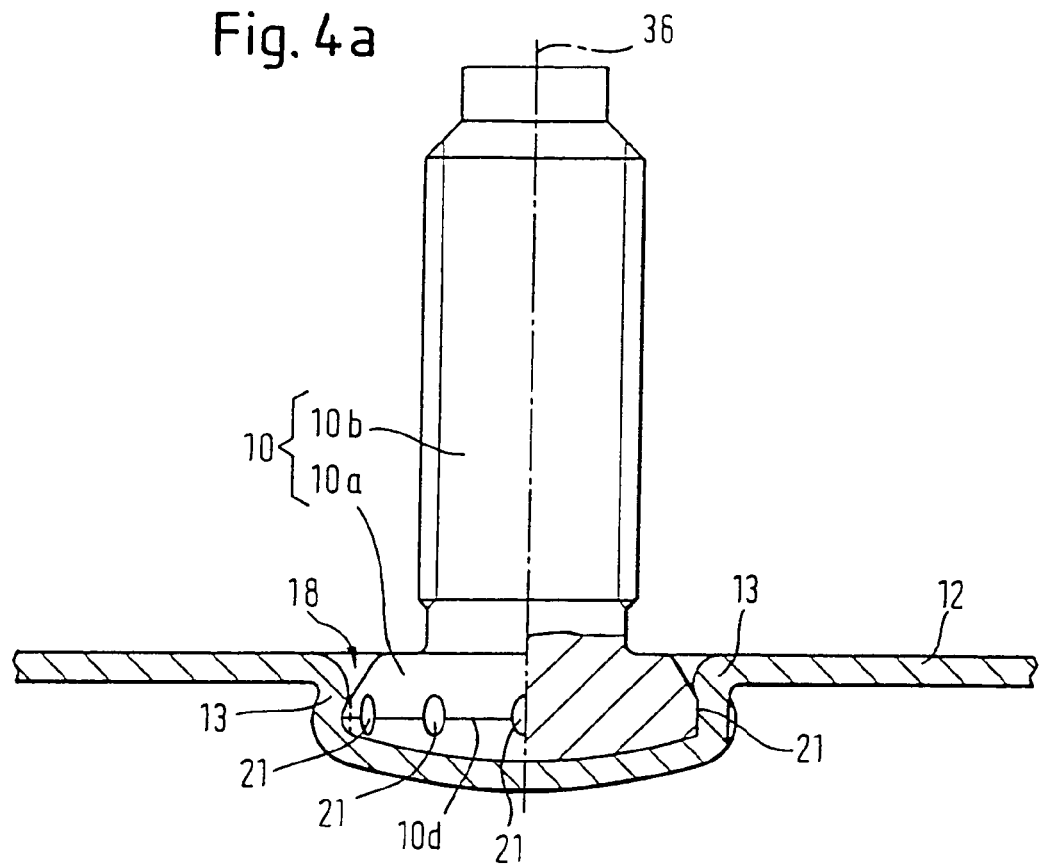

An advantage of the method of the invention lies in the fact that—as can in particular be seen from FIG. 4a—the sheet metal part 12 is not perforated or holed during the attachment of the functional element 10, so that the sealed nature of the sheet metal part with respect to liquids and/or gases is preserved, and a universely utilizable component assembly is provided which can have a plurality of functional elements, which can also be of different design.

Figure 4B:
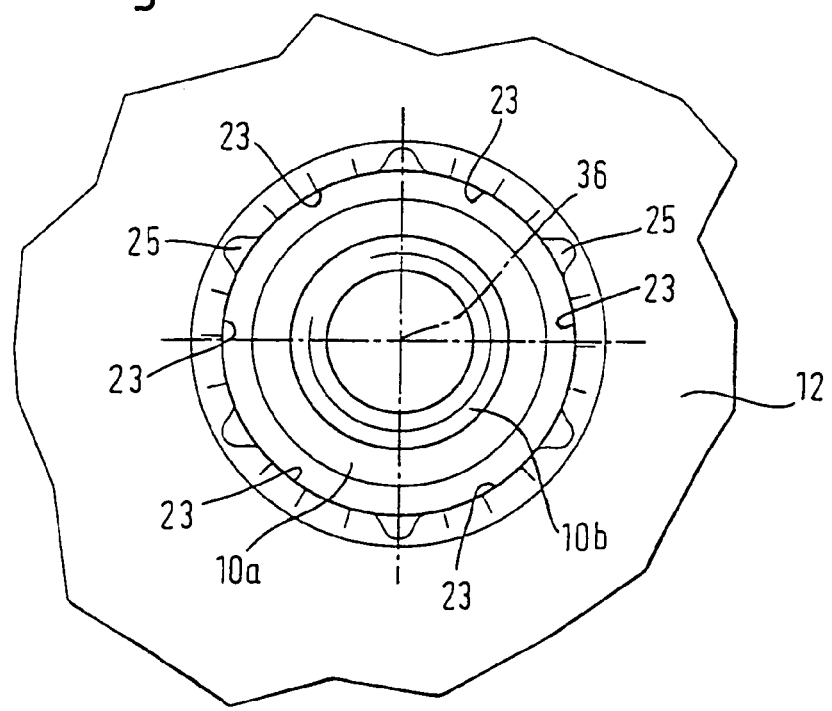

The plan view of FIG. 4b shows the six regions 23 in which the projections 20 or 120 of the shaped parts 16, 116 respectively have pressed the sheet metal material into the undercut 18 in pronounced manner. The somewhat set back rounded regions 25 which respectively lie between two adjacent regions 23 correspond to the regions in FIG. 2b between respective pairs of adjacent shaped parts 16 in which the projections 20 are not present and thus do not act directly here.

Figure 4C:
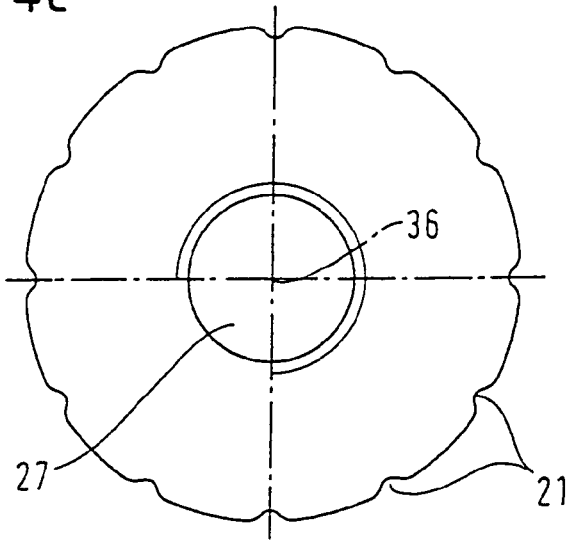
Figure 4D:
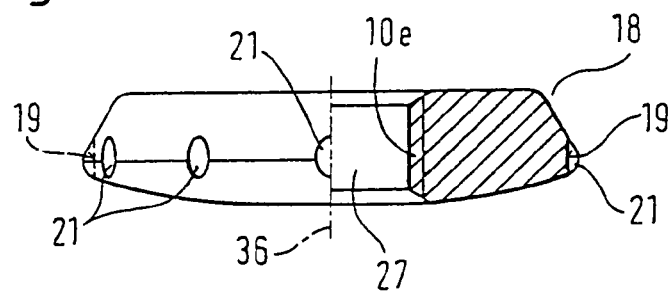

The FIGS. 4c and 4d show that the invention is in no way restricted to bolt-type functional elements with a head part and a shaft part. Instead of this, as is shown in these figures, the invention can be used in just the same manner with hollow bodies, for example with nut elements, with the nut element, shown in this example with an internal thread 10e, having a shape corresponding to the head part 10e of the functional element of FIGS. 1a and 1b with a central bore or a central hole 27 which is arranged coaxial to the longitudinal axis 36 of the element. The external shape of the nut element of FIGS. 4c and 4d corresponds extensively to the design of the head part of the corresponding element of FIGS. 1a and 1b, which is the reason that the same reference numerals have been used for the same features as in FIGS. 1a and 1b and also why the same description also applies for these embodiments.

Figure 4E:
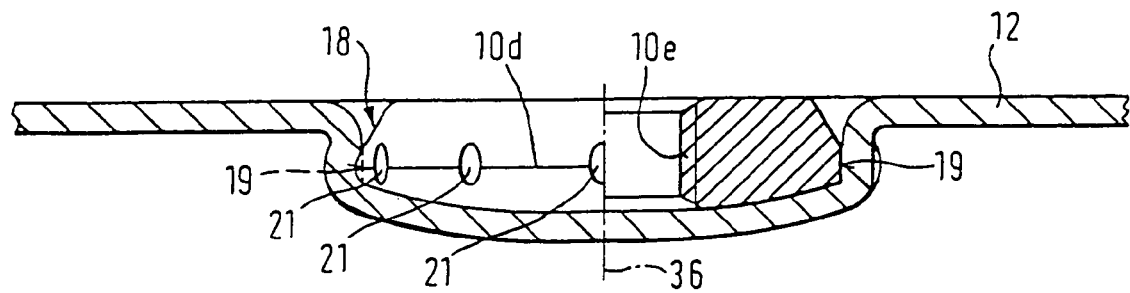

This also applies to the component assembly in accordance with FIG. 4e which shows the element of FIGS. 4c and 4d after attachment to a sheet metal part 12b.

The rounded shape of the head part 10a of the functional element 10, which is in particular recognizable from FIG. 1b, has the advantage that weak points of the sheet metal part 12 which could be produced by sharp edges on the functional element 10 are avoided. Such weak positions could lead, in particular with alternating loads on the connection between the functional element 10 and the sheet metal part 12, to material fatigue and ultimately to a loosening or release of the connection.

Figure 6A:
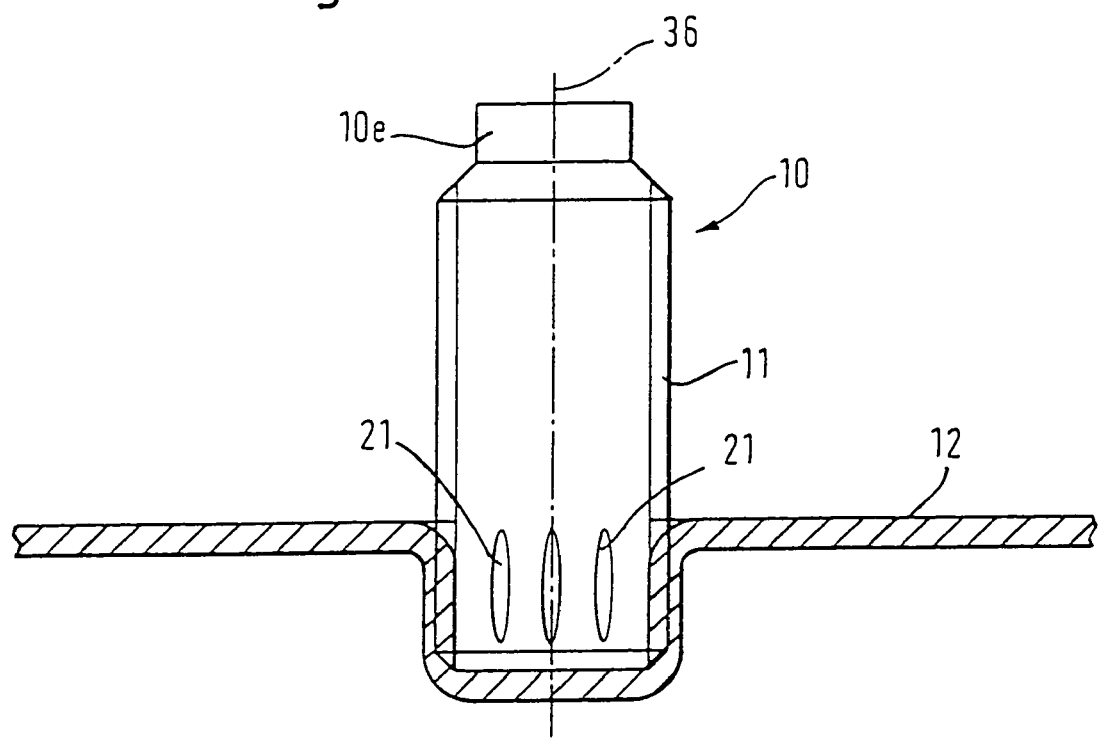
Figure 6B:
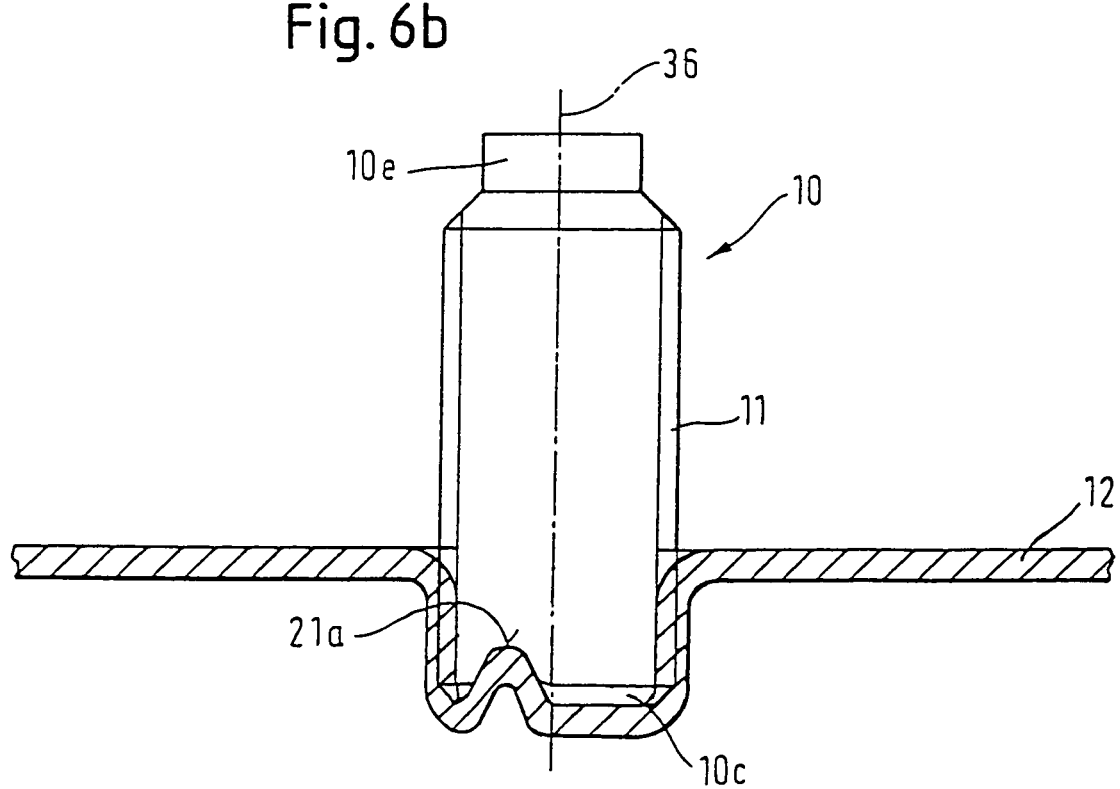

The FIG. 5 and also the FIGS. 6a and 6b each show a functional element 10 formed as a threaded pin, the attachment of which to a sheet metal part 12 basically takes place in accordance with the above described procedure, with the thread 11 of the threaded pin 10 in each case representing a region with undercuts in the sense of the invention.

Such threaded pins can be manufactured by a comparatively simple and cost favourable route in a rolling process in which long round bars are provided with a thread by rolls having correspondingly shaped rolling surfaces.

FIG. 5 shows a threaded pin 10 prior to its attachment to a sheet metal part 12, with the threaded pin 10 tapering at its end remote from the sheet metal part 12 and there having a thread-free neck section 10e. At its peripheral wall the threaded pin 10 is provided with features 21 which can be executed in the form of raised portions and/or recesses which provide security against rotation and which are merely indicated in FIG. 5.

Both the thread-free neck section 10e and also the features 21 providing security against rotation can be simultaneously formed by correspondingly executed rolls during the manufacture of the threaded pin 10, so that the long threaded bar which thereby arises can be cut through in each case in the thread-free regions for the production of individual shorter threaded pins. The cutting to length can also be realised during the rolling process by a special design of the thread rolling tools.

FIG. 6a shows the threaded pin 10 of FIG. 5 in the state in which it is attached to the sheet metal part 12 in which the sheet metal material has been pressed by the shaped part, or by the shaped parts, of the die both into the thread 11 and also into the features 21 providing security against rotation.

In principle it would also be possible to locally press in the thread 11 during the attachment of the threaded pin 10 to the sheet metal part 12 using features of shape formed on the shaped parts of the die through the intermediary of the sheet metal material, i.e. to destroy the thread to a certain degree, in order in this manner to provide features providing security against rotation on the peripheral wall of the threaded pin 10.

FIG. 6b shows a further threaded pin 10 attached to a sheet metal part 12 with the threaded pin 10, in contrast to the threaded pins of FIGS. 5 and 6a, not having any features providing security against rotation at its peripheral wall. Instead of this the threaded pin 10 is provided at its underside confronting the sheet metal part 12 with at least one recess 21 serving as a feature providing security against rotation, with the recess 21 being eccentrically arranged with respect to the longitudinal axis 36 of the threaded pin 10. The sheet metal material is pressed into this recess 21 by means of the correspondingly shaped die or correspondingly shaped parts of the die, whereby the threaded pin 10 cannot be turned relative to the sheet metal part 12. Alternatively, or in addition to the recess 21, raised portions on the lower side 10c of the threaded pin 10 can be provided as features providing security against rotation.

Basically a combination of the above explained features 21 providing security against rotation on a threaded pin 10 is conceivable.

The above described attachment of the functional element 10 to the sheet metal part 12 preferably takes place in all the above-mentioned embodiments in a manner which is customary nowadays in sheet metal processing, namely by means of a press or by means of a robot through co-operation of a setting head mainly not shown in the drawings with the die.

In this respect the die is for example received in a lower tool of a press while the setting head is attached to an upper press tool or to intermediate plate of the press. Other possibilities of attachment also exist. For example the die can be attached to the intermediate plate of the press and the setting head can be attached to the upper tool of the press. Inverse arrangements are also conceivable in which the die is attached in the upper tool of the press and the setting head in the lower tool of the press or on the intermediate plate. Provision of such a press is however not essential. By way of example arrangements are possible in which the die and setting head are carried by a robot and the required relative movement between the setting head and the die in the direction of the longitudinal axis of the functional element is either produced by the robot itself or by the action of force from the outside.

In a manner known per se the respectively used setting head has a normally tube-like sheet metal hold-down part which presses the sheet metal part against the immovable end face 40c and 140c of the die or against the upper side of the tool (not shown) accommodating the respective die 14, 114. A particularly preferred embodiment of the functional element of the invention and also of the die and of the method for attaching the element will now be described with reference to the FIGS. 7, 8, 9, 10 and 11a–11k.

For this description the same basic reference numerals will be used as previous figures but increased by the number 200 in order to bring about a distinction over the previous figures. The previous description however applies for parts which will now be described and which have the same last end digits, unless something is stated to the contrary in the following description.

Figure 7:
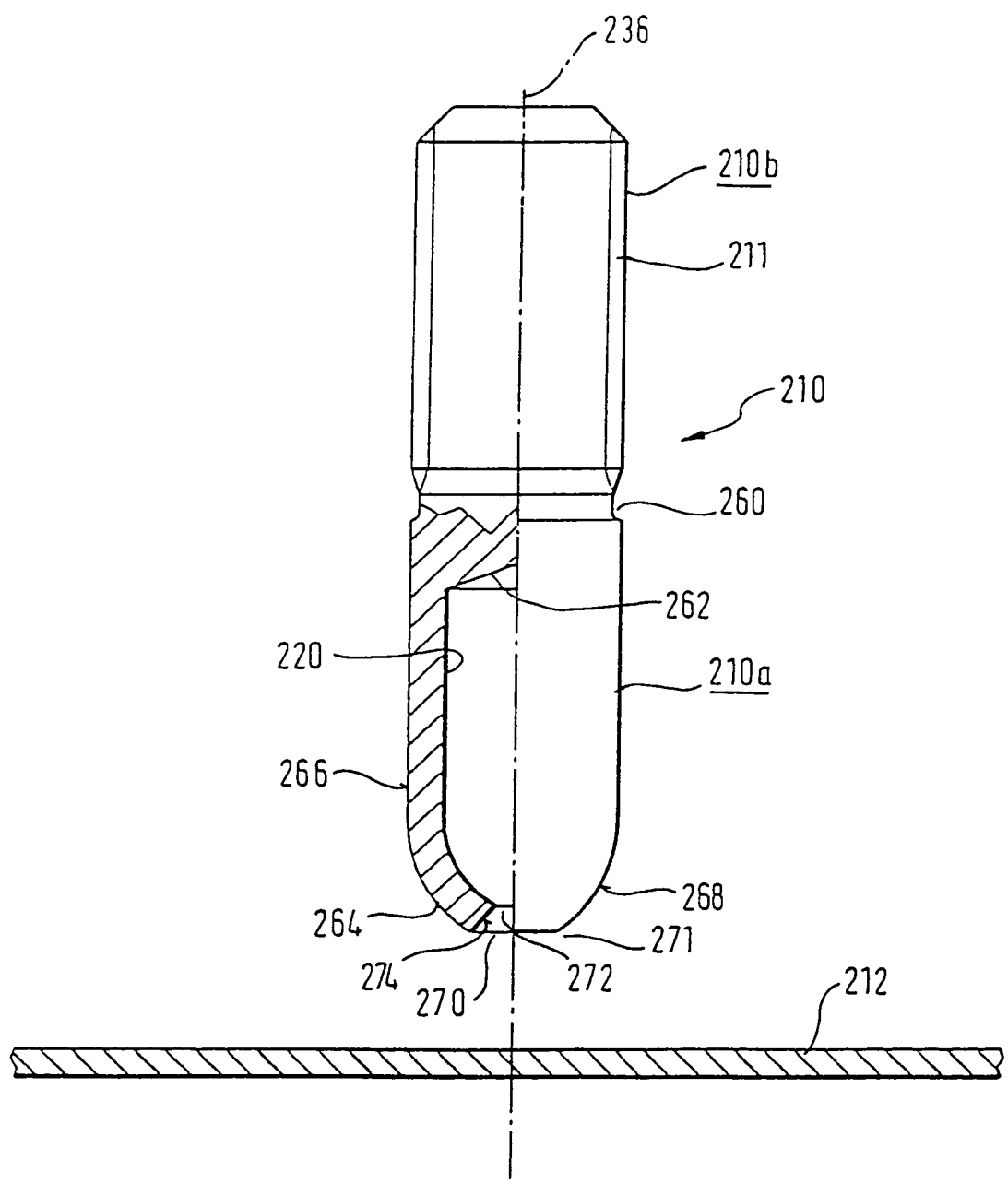

FIG. 7 shows first of all a functional element 210, here in the form of a bolt element having a shaft part 210b with a thread 211 and a hollow head part 210a having at least substantially the same outer diameter as the shaft part 210b. It is pointed out that the shaft part 210b must not necessarily be executed with a thread 211, but could, now as previously, have a form which differs from it as desired to achieve the respectively envisaged function. For example the shaft part 210b can be formed as a smooth guide spigot or as a carpet fastening pin with a ring groove enabling a snap connection with a carpet eye. Particularly favourable with this element is, amongst other things, the fact that the shaft part 210b and the head part 210a have at least substantially the same outer diameter so that the functional element can be produced at favourable costs from bar or wire material. It is however not essential that the shaft part 210b and the head part 210a have the same diameter but rather considerable diameter differences could be present, with this however signifying in general greater cost and complexity in the manufacture of the element.

As can be seen from FIG. 7 the head part 210a has a cylindrical bore 220 which can be produced either by a drill or by a cold forming process. In this example the bore 220 terminates, going in the direction of the shaft part 210b, shortly before the ring groove 260 representing the boundary to the shaft part 210b, and indeed in a conical recess 262. This is however not essential. The element could also be manufactured of tube material whereby the bore 220 would then extent through the shaft part 210b but the diameter of the bore 220 in the region of the shaft part 210b should then be preferably significantly smaller than the diameter of the bore 220 in the head part 210a, so that the functional element is only deformed in the head region during the attachment of the sheet metal part 212.

The previously right cylindrical ring wall 266 of the head part 210a tapers at the end region 264 remote from the shaft part 210b to a rounded, bullet-like formation 268, with the end face 270 not being closed but rather being open and defining an opening 272 which is significantly smaller than the diameter of the cylinder bore 220. The end region 264 of the functional element 210 is, so to say, spherically rounded with a flat open end face 270. As can be seen from FIG. 7 the hollow end region 264 of the element is formed like a truncated cone between the end face 270 and the opening 272, and indeed so that the end region 264 of the head part 210a has a ring-like oblique surface 274 at the inner side with an included cone angle of approximately 90°. The wall thickness of the hollow region of the head part 210a is at least substantially the same over the full length of this region. The reference numeral 236 points to the central longitudinal axis of the functional element 210 and it is evident that the shaft part 210b and the head part 210a are arranged coaxially to one another with reference to the central longitudinal axis 276. Although the head part 210a of the functional element is circular in cross-section in this embodiment it is conceivable to select a cross-sectional shape which differs from the circular shape, for example a polygonal form or a form with longitudinal grooves or longitudinal ribs, in particular when improved security against rotation is desired in the in-built state.

The functional element 210 can, as stated, be manufactured from bar material, from wire material or from tube material and indeed by a rolling process to generate the outer features of shape of the functional element, optionally in combination with a drilling or upsetting process for the manufacture of the cylinder bore 220. As an alternative to this the element can also be produced by a cold forming process or by a high pressure shaping process, which in particular come into question when tube material serves as the starting material for the element.

Figure 8:
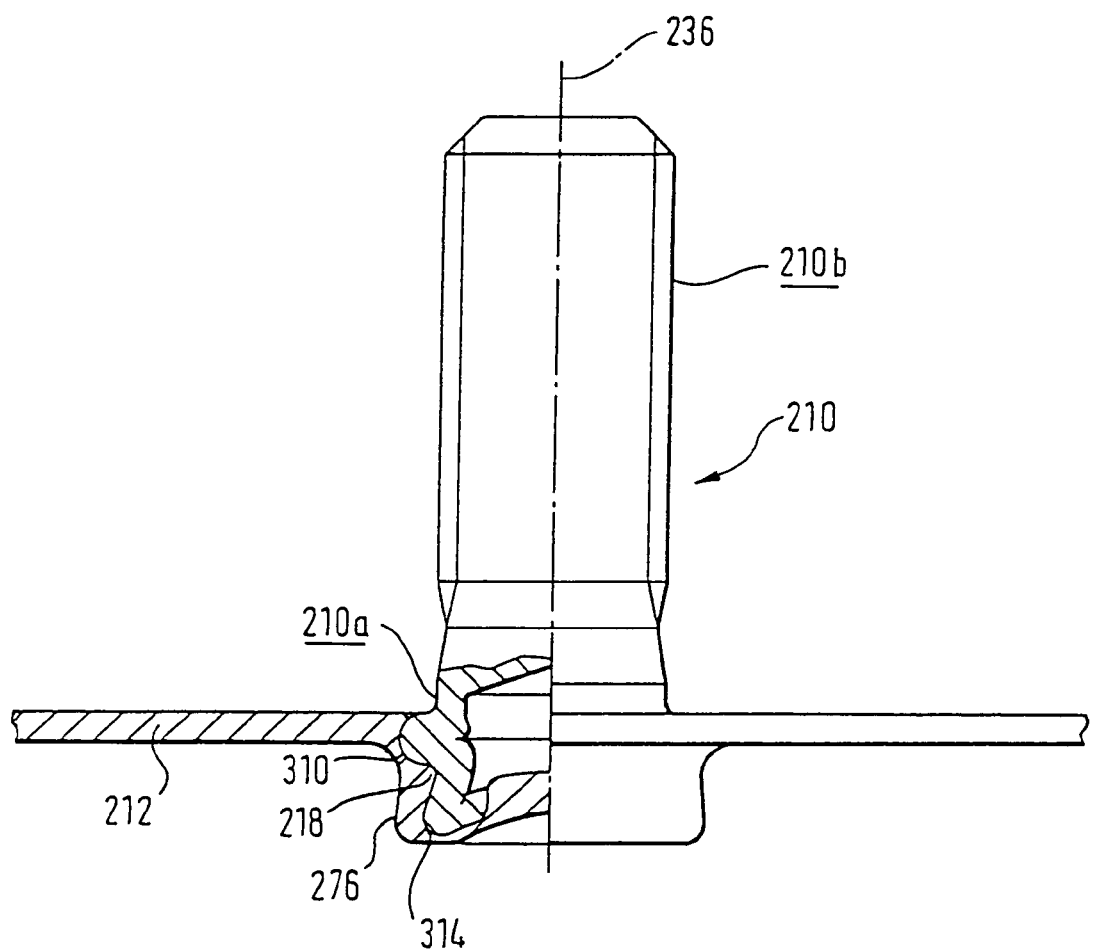

FIG. 8 now shows the functional element 210 in the in-built state in a sheet metal part. One notes that the shaft part 210b is considerably deformed and is connected in form-fitted manner to a pot-like recess 276 of the sheet metal part 212 formed by the attachment process, with the shaft part 210b not penetrating the sheet metal part 212, so that a fluid-tight connection is present, e.g. in the sense that water which may eventually be present beneath the sheet metal part cannot pass through the sheet metal part around the functional element 210 up to the upper side of the sheet metal part.

Figure 9:
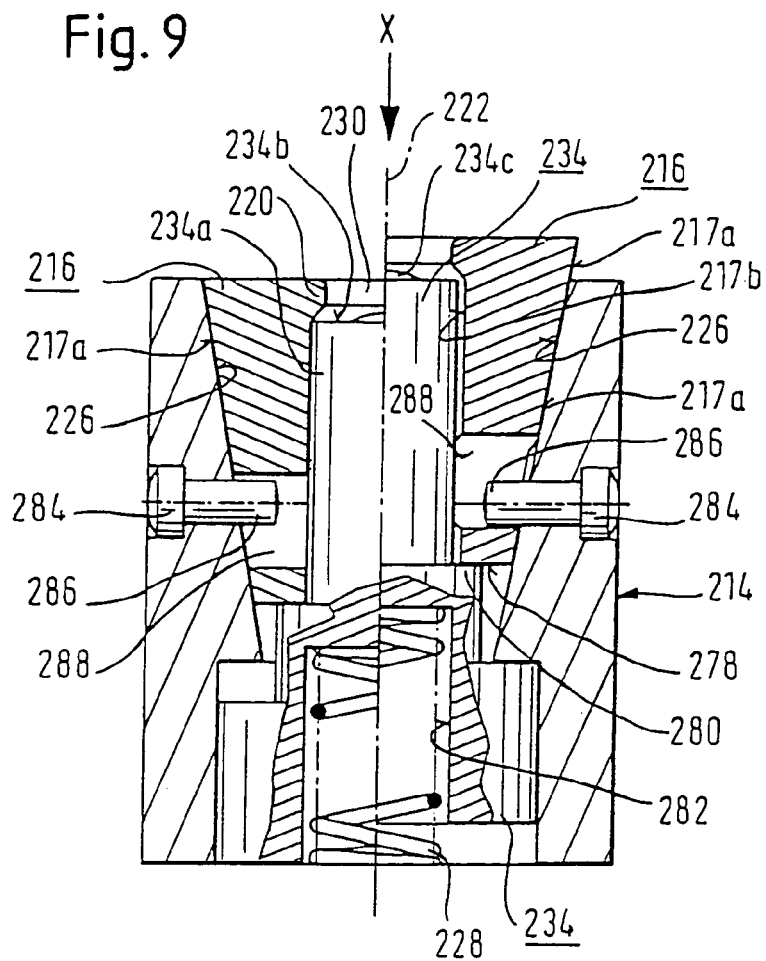
Figure 10:
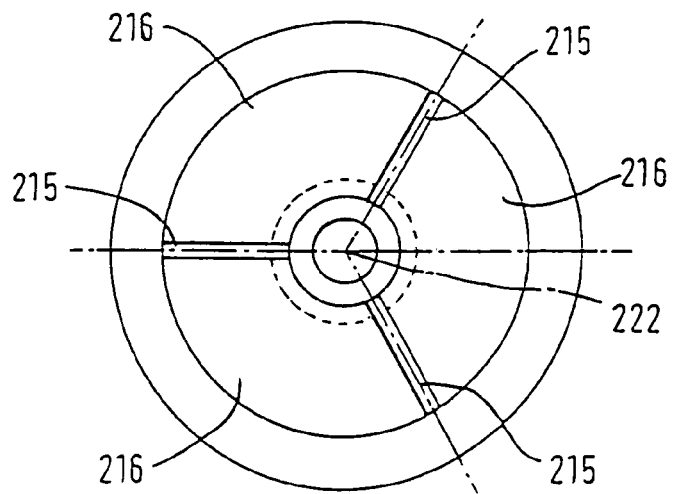

For the attachment of the element in the sheet metal part the die in accordance with FIG. 9 and 10 is used, which is similar to the die of FIG. 3.

As can be seen from FIGS. 9 and 10 the present die however has only three shaped parts 216 which in this case are also displaceable in the axial direction 222 of the die.

The shaped parts 216 in FIGS. 9 and 10 each lie with an oblique outer surface 217a on a truncated cone-like shaped surface 226 which converges obliquely towards the central longitudinal axis 222 and are supported at a lower side 278 extending perpendicular to the longitudinal axis 222 of the die 214 on a ring shoulder 280 of a centrally arranged abutment element 234, with the abutment element 234 being pressed upwardly in FIG. 9 by a compression coil spring 228. The compression coil spring 228 is namely located in a cylindrical bore 282 of the abutment element 234 arranged coaxial to the longitudinal axis 222 and its end face presses against the closed end of the bore 282 in the abutment element 234 and at its other end against a lower tool of the press in which the die 214 is arranged. As an alternative to this the die 214 of FIG. 9 can be provided at its lower end with a base part, similar to the base part 140a of the FIG. 3 embodiment against which the compression coil spring 228 will then be supported at its lower end. An embodiment of this kind would have the advantage that the die represents a unit, individual parts of which cannot be lost.

Three pins 284 project in the radial direction through the cylindrical wall of the die 214, with the free end 286 of each pin (only two shown) projecting into a corresponding cut-out 288 of the respectively associated shaped part 216. The pins 284 hereby restrict the maximum outward movement of the shaped parts (shown at the right hand side of FIG. 9) and hold the shaped parts 216 secure against loss and in the desired radial arrangement in the die 214, so that the gap-like intermediate spaces, which are located between the shaped parts 216 and are necessary in the open state of the die, and which are substantially reduced to zero and closing of the die, arise automatically under the action of the compression coil spring 228. For this purpose the width of the respective cut-outs 288 in the respective shaped parts 216 corresponds at least substantially to the diameter of the respective ends 286 of the pins 284.

As is likewise evident from FIG. 9 the abutment element 234 has a cylindrical part 234a above the ring shoulder 280 with an end face 234b which bounds the base of a substantially cylindrical shaping space 230 bounded in other respect by the shaped parts 216. One notes that in this embodiment the end face 234b of the abutment element 234 has a centrally arranged dome-like projection 234c which is surrounded by a ring surface 234d standing perpendicular to the longitudinal axis 222.

As in the embodiment of FIG. 3 the shaped parts 216 lie with their radially inwardly directed part-cylindrical surfaces 217b against the cylindrical outer surface of the upper part 234a of the abutment element in the closed state of the die (to the left of the central longitudinal axis 222 in FIG. 9).

As likewise evident from FIG. 9 the shaped parts 216 are each provided in the region of their upper ends with a bead-like projection 220 facing the longitudinal axis 222 with which, in a manner which will be described later, sheet metal material of the sheet metal part 212 can be pressed into an under-cut of the functional element 210. In this embodiment the bead-like projections 220 form the lateral boundary of the shaping space 230.

A description will now be given with reference to the FIGS. 11a to 11k as to how the functional element 210 can be attached with the aid of the die 214 to the sheet metal part 212.

FIG. 11a shows the starting state in which the die 214 is located in the lower tool of a press, a sheet metal part 212 is arranged above the die and the functional element 210 is held in a schematically illustrated setting head 300, for example by a ring spring of plastic (not shown) which ensures a frictional engagement between the head part 210a of the functional element 210 and a bore 302 of the setting head. One notes that the longitudinal axis 236 of the functional element 210 is aligned with the longitudinal axis 222 of the die 214 and simultaneously corresponds to the central axis of the bore 302 of the setting head 300. One notes also that all shaped parts 216 are located in their upper position in accordance with the right hand half of FIG. 9, i.e. the lower boundary of the respective cut-outs 288 of the shaped parts 216 is in contact with the underside of the respective end 286 of the respective pin 284. This position arises as a result of the action of the compression coil spring 228 which pushes the abutment element 234 upwardly so that the ring shoulder 282 presses against the lower contact surfaces 278 of the respective shaped parts 216. In the setting head 300 there is an inserted plunger 304, the lower end face 306 of which presses onto the upper end face 308 of the shaft part 210b of the functional element 210.

It should be pointed out that although it is assumed here that the die 214 is arranged in the lower tool of the press, it can optionally also be arranged in an intermediate plate of the press or indeed in the upper tool of the press, with the setting head 300, depending on the mounting location of the die, being arranged on an intermediate plate of the press, on the upper tool of the press or in the lower tool of the press. In other respects it is not essential that the die 214 and the setting head 300 are located in a press, they could for example be moved toward one another and away from one another by a robot or represent parts of a different type of tool.

In any event FIG. 11b shows the first stage of the joining process in which the setting head 300 has moved downwardly relative to FIG. 11a onto the die 214, so that the end 270 of the functional element 210 has pressed the sheet metal part 212 onto the upper end face 232 of the shaped parts 216.

In the further course of the joining process the setting head 300 moves further towards the die 214 and the end face of the functional element 210 presses the sheet metal material into the shaping space 230 so that a recess 212a is formed there in the sheet metal part 212. The force which is exerted via the setting head and the functional element onto the sheet metal part is not sufficient in order to depress the shaped parts 216 against the force of the compression coil spring 228 so that, as shown in FIG. 1d, the deformation 212a, i.e. the denting of the sheet metal part 212 continues further without an axial deviation movement of the shaped parts 216 until the sheet metal part 212 is clamped between the dome-like projection 234c of the abutment element 234 and the end face 270 of the head part 210a of the functional element 210, with the dome-like projection 234c producing a slight upwardly directed dent 212b in the sheet metal part, so that this is pressed somewhat into the opening at the end face of the functional element.

Figure 11C:
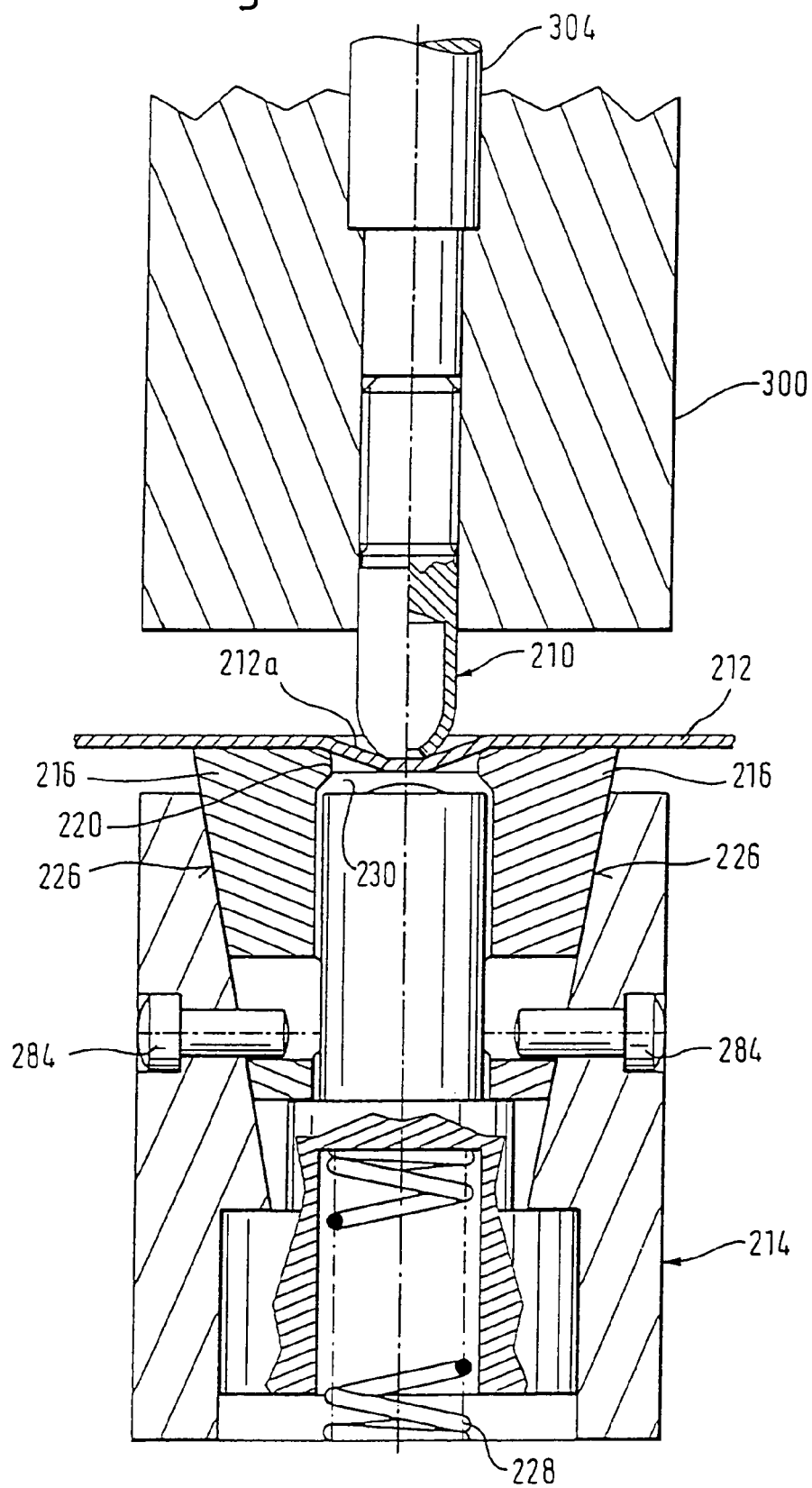
Figure 11D:
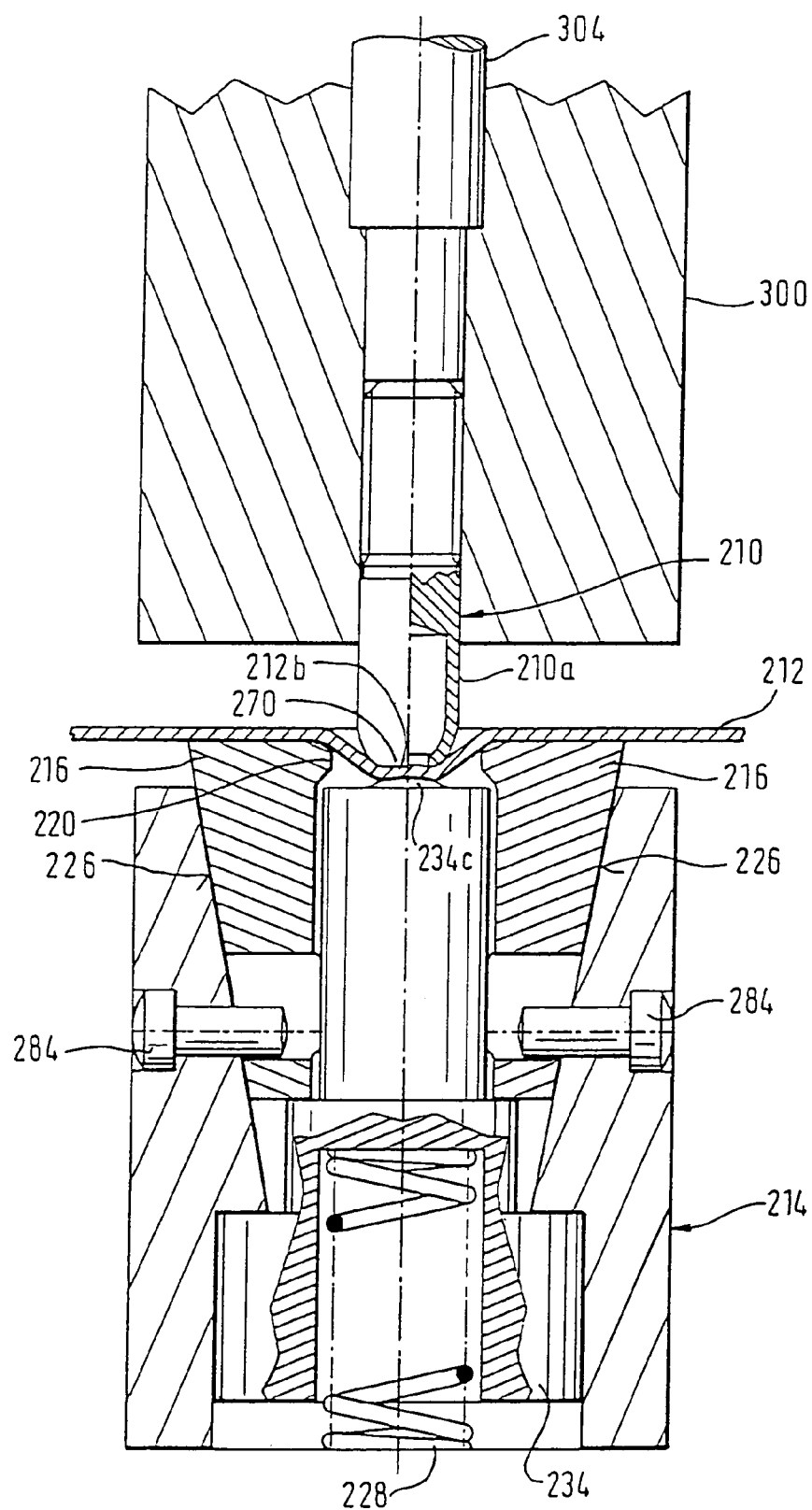
Figure 11E:
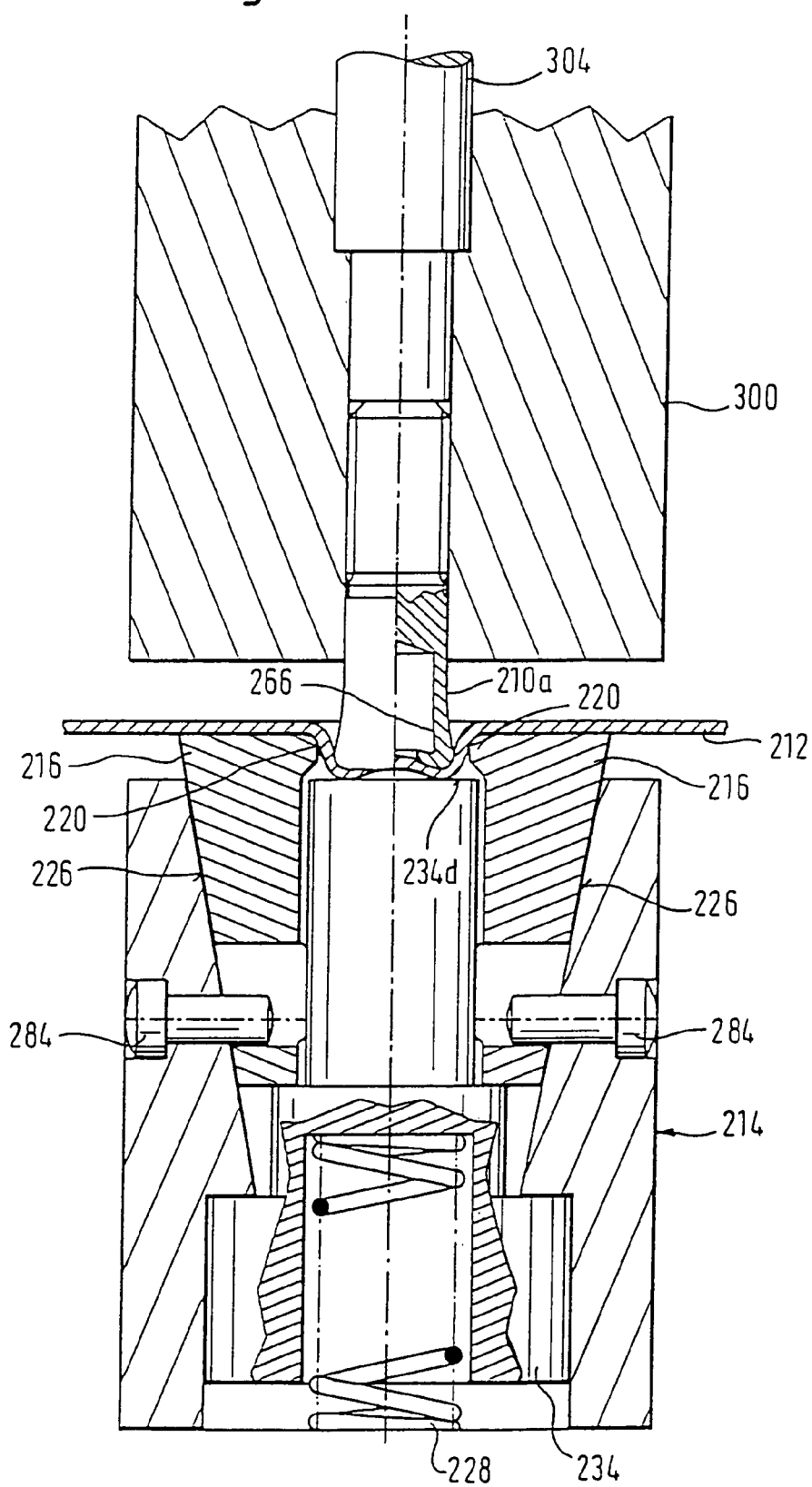

In the further stage of the closing movement of the press the setting head 300 moves further towards the die 214 and the force exerted via the functional element 210 onto the abutment element 234 is still not sufficient in order to compress the compression coil spring 228, but rather the force exerted on the head part 210a of the functional element 210 leads to a deformation of its lower end so that the shape results which is shown in FIG. 11e. One notes that the sheet metal part 212 has laid itself around the rounded edges of the bead-like projections 220 so that the end face of the head part 210a of the functional element has pressed the sheet metal part against the ring surface 234d and that during these deformations the end face of the head part 210a is itself deformed, so that the functional element is slightly radially outwardly broadened in the region of the end face, whereas the region around the previous end face 270 was deformed axially inwardly. One also notes that the wall thickness of the cylindrical wall region 266 of the head part 210a has changed as a result of the deformation.

Figure 11F:
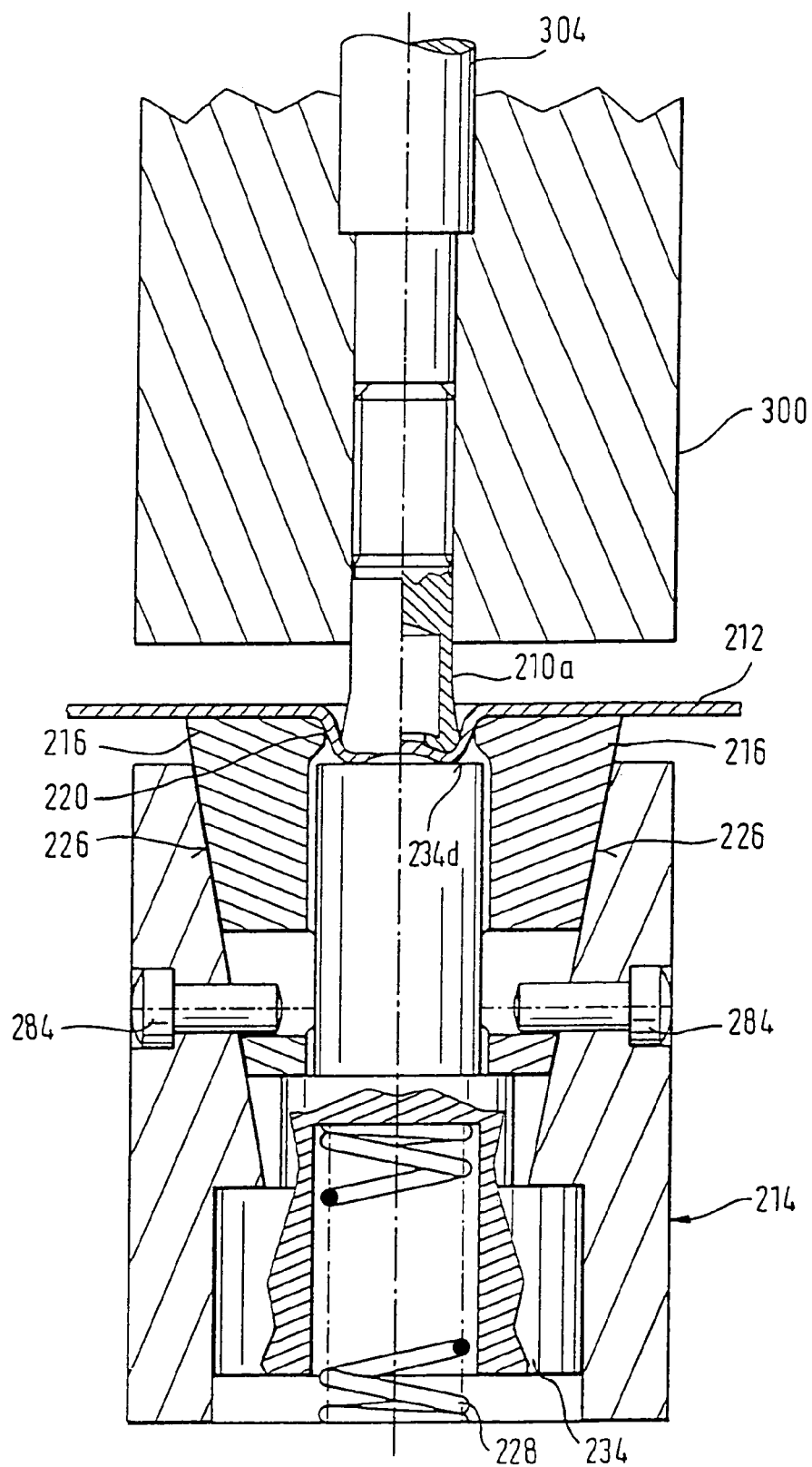

The representation of FIG. 11f is similar to the representation of FIG. 11e, one sees here a further advanced deformation of the sheet metal part 212 which is now less thick in the region above the ring surface 234d in comparison to FIG. 11e. The shaped parts or segments 216 are still located in the upper position, i.e. the compression coil spring 228 has still not been compressed by the force of the setting head. This also applies to the illustration of FIG. 11g, where the setting head 300 has moved further downwardly in the direction towards the die 214, whereby a pronounced further deformation of the head part 210a of the functional element has taken place and the sheet metal part has further reduced in thickness in the region of the ring surface 234d and in the lower region of the dome-like projection 234c.

Figure 11G:
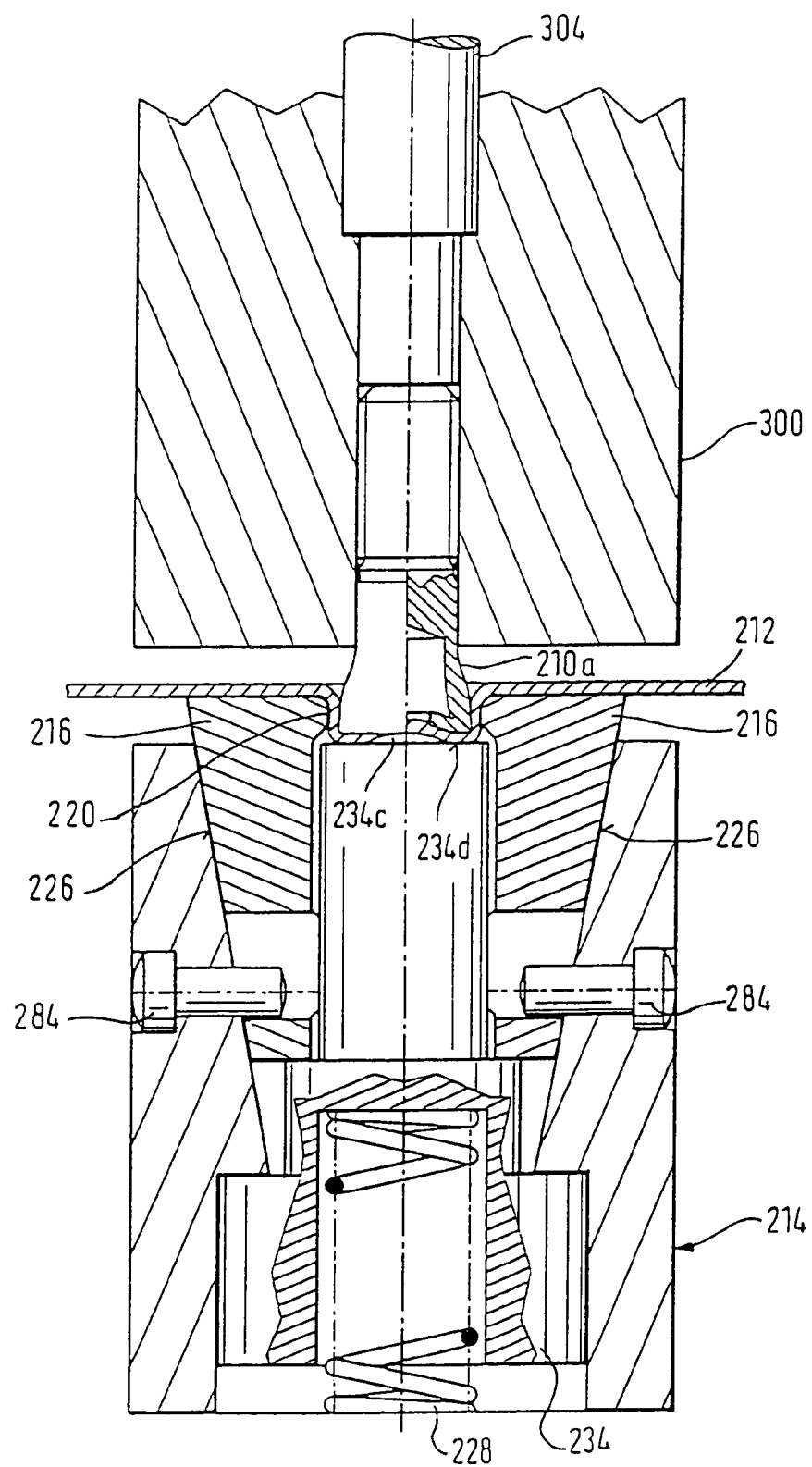
Figure 11H:
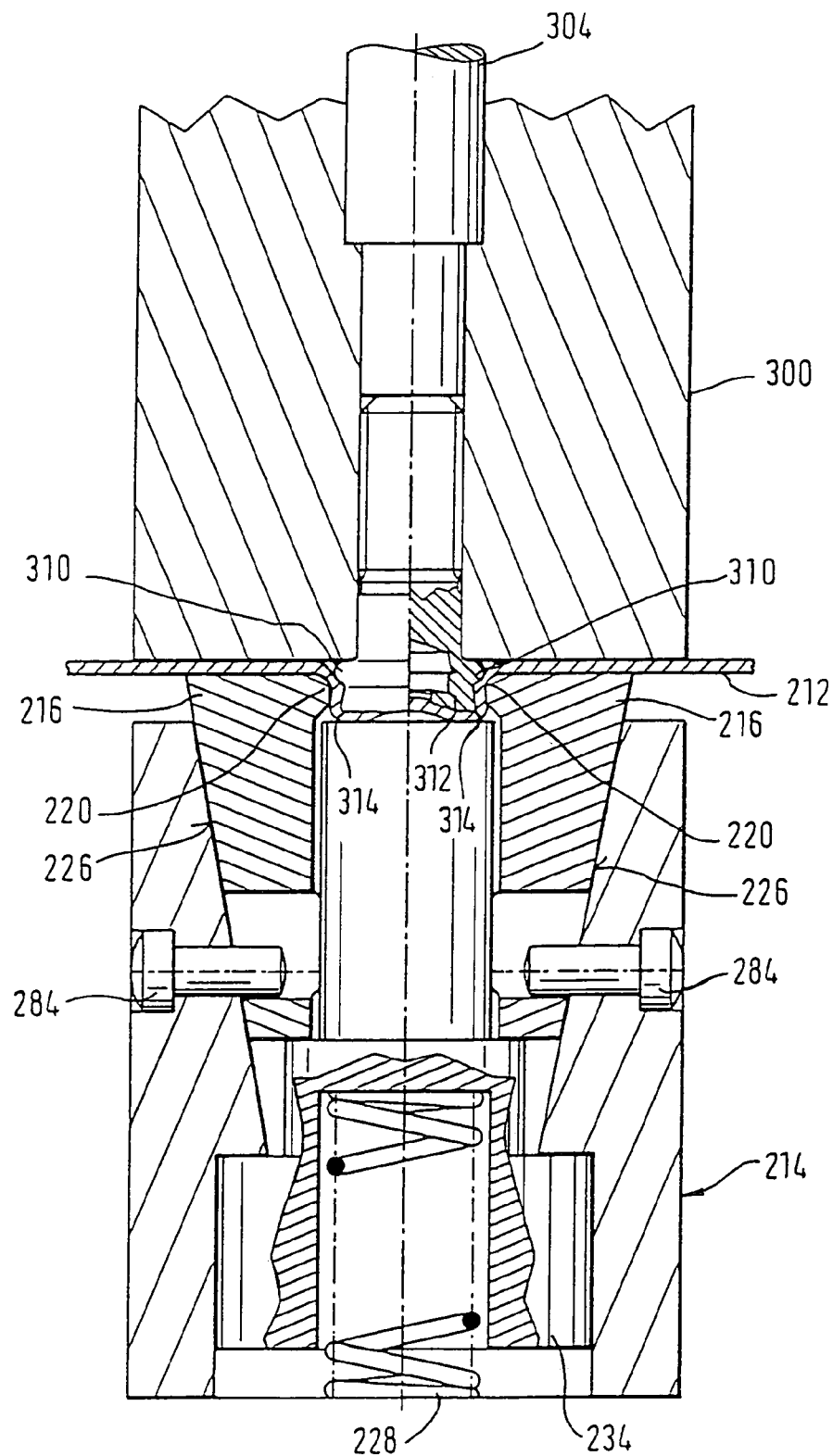
Figure 11I:
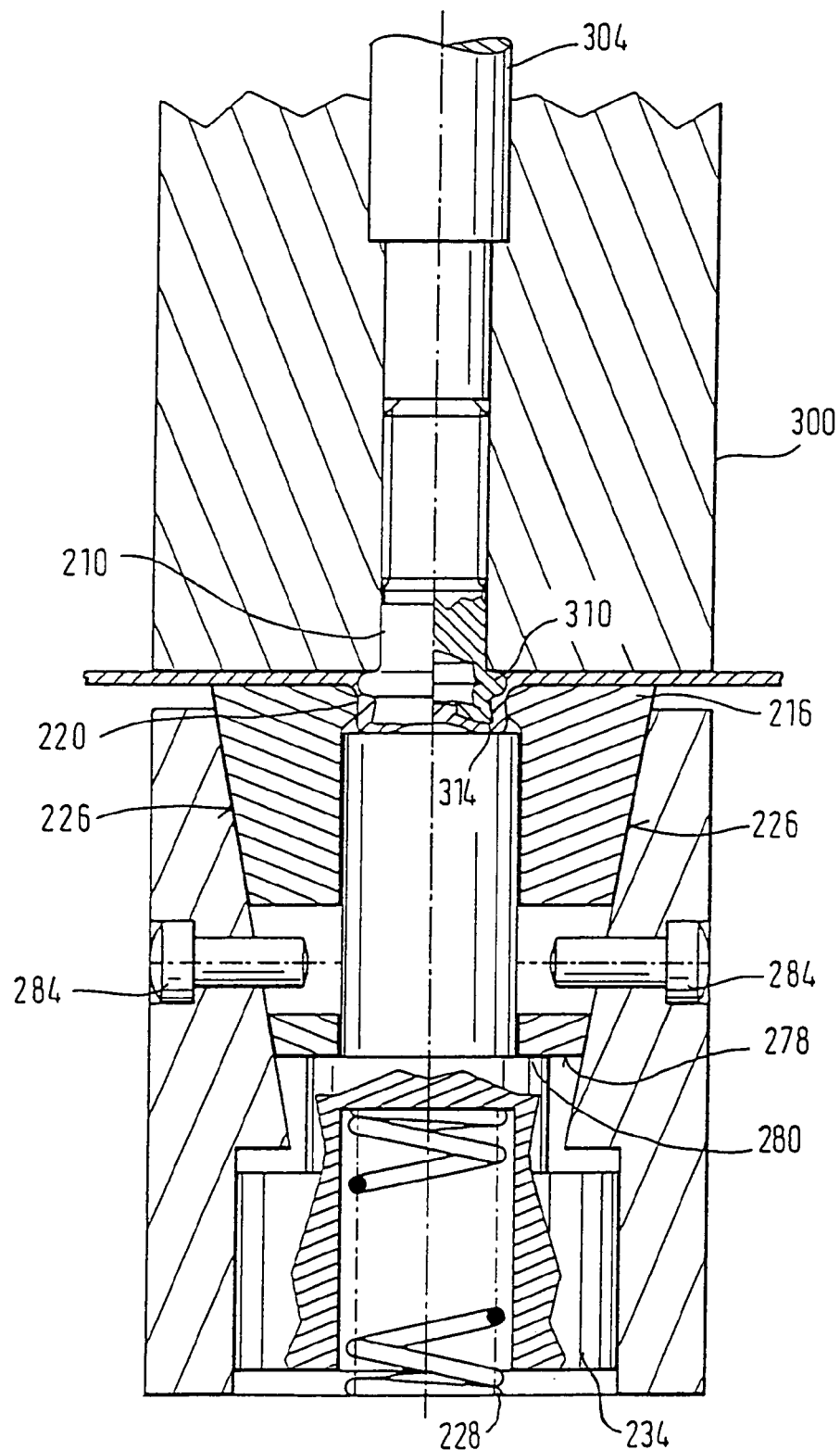

This deformation of the head part 210a of the functional element 210 now progresses while the setting head 300 of the die 214 approaches further until the state of FIG. 11h is reached. One notes that on the cylindrical wall region of the head part 210a has now been so compressed that a radially outwardly projecting bead 310 is formed as a result of a folding of the cylindrical wall region and one also notes that a further pronounced folding is present at the point 312, where the axially directed wall of the head part 210a merges into the radially inwardly directed region which is formed from the previous end face of the head part 210a. The material of the head part 210a starts at the point of this fold to form a second radially outwardly directed bead-like projection 314. One also notes that the ring-like, bead-like projection 310 has pressed in the sheet metal part 212 in the region of the rounded portion of the bead-like projections 220 of the shaped parts, so that the sheet metal thickness has become smaller there. In the state of FIG. 11h the force of the spring is still sufficient to prevent a closing movement of the shaped parts 216 of the die. After reaching the state of FIG. 11h the closing forces however are now so large that the shaped parts now move downwardly as shown in FIG. 11i, the compression coil spring 228 is compressed and the shaped parts 216 simultaneously press the abutment element 234 downwardly via the contact surface 278 and the ring shoulder 280, so that the axial height of the shaping space 230 does not change. Since the downwardly directed movement of the shaped parts 216 has led to them sliding along the oblique shaped surface 226 of the die they are forced to simultaneously move radially inwardly, whereby, on the one hand, the gap spaces 215 between the individual shaped parts 216 become smaller and, on the other hand, the radially inwardly directed movement of the bead-like projections 220 of the shaped parts 216 presses the sheet metal material of the sheet metal part 212 into the ring-like groove which has formed between the bead-like projection 310 of the functional element and the lower end of the head part 210a. This closing movement of the die, i.e. the radially inwardly directed movement of the shaped parts 216 then continues until, as shown in FIG. 11g, the close state of the die has been reached, the sheet metal part is fully enclosed between the end face of the setting head and the end face of the die 214 facing it. The result of this further compression movement is, that the ring-like under-cut 218 between the bead-like projection 310 and the bead-like projection 314 at the lower end of the head part 210a is even more pronounced and an even more intimate connection with the sheet metal material has taken place in this region. Furthermore the sheet metal material partly engages over the bead-like projection 310 of the functional element, so that a form-fitted connection also arises here.

One also notes that the deformed lower end face of the functional element has now greatly thinned the sheet metal material in the region of the base of the pot: however, the sheet metal material 212b in the end face opening of the lower end of the functional element 210 has become thicker, as a result of the shifting of the sheet metal material and there supports the deformed side of the head part 210a of the functional element, so that the form-fitted connection to the sheet metal part is a truly secure connection.

Figure 11J:
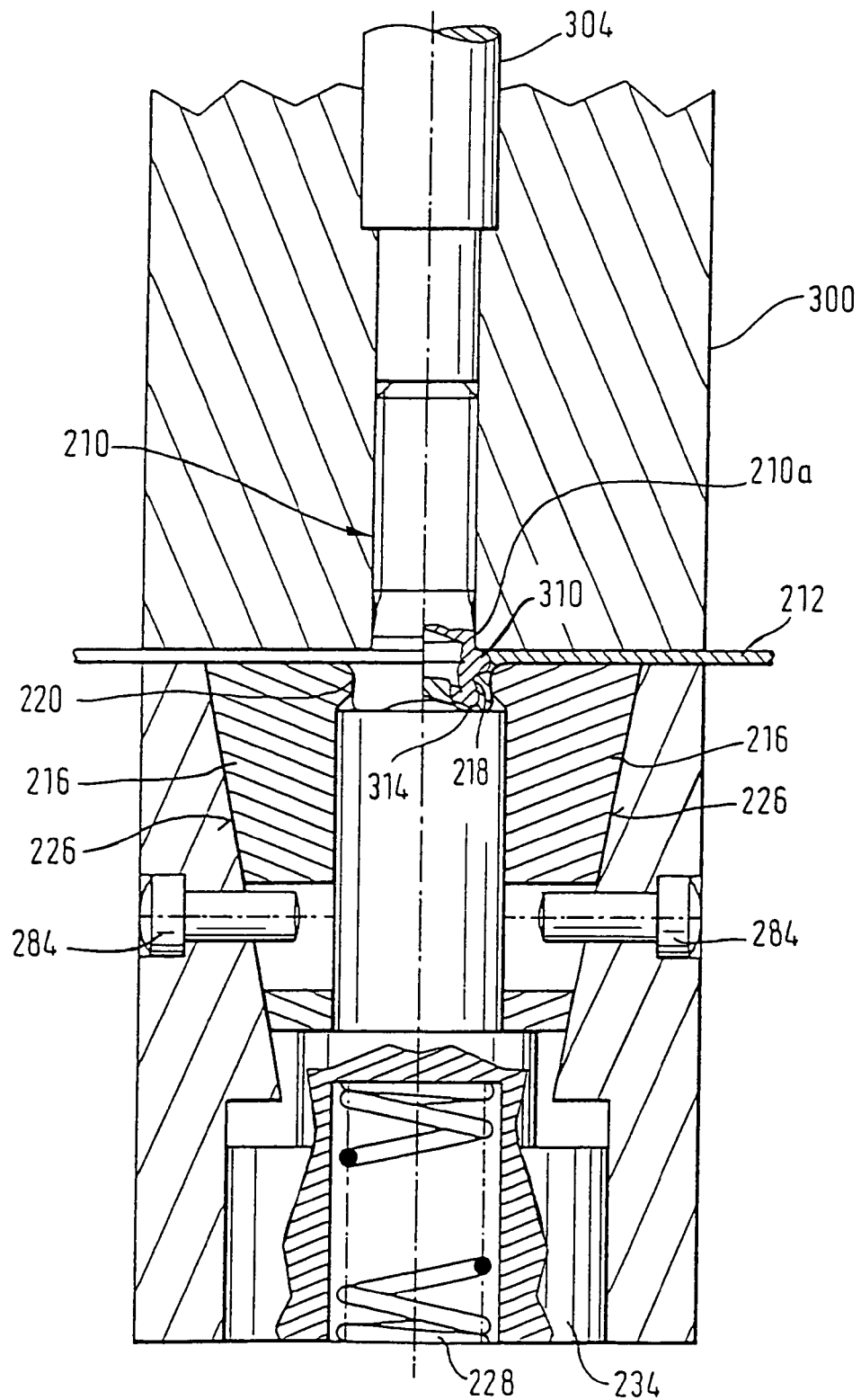
Figure 11K:
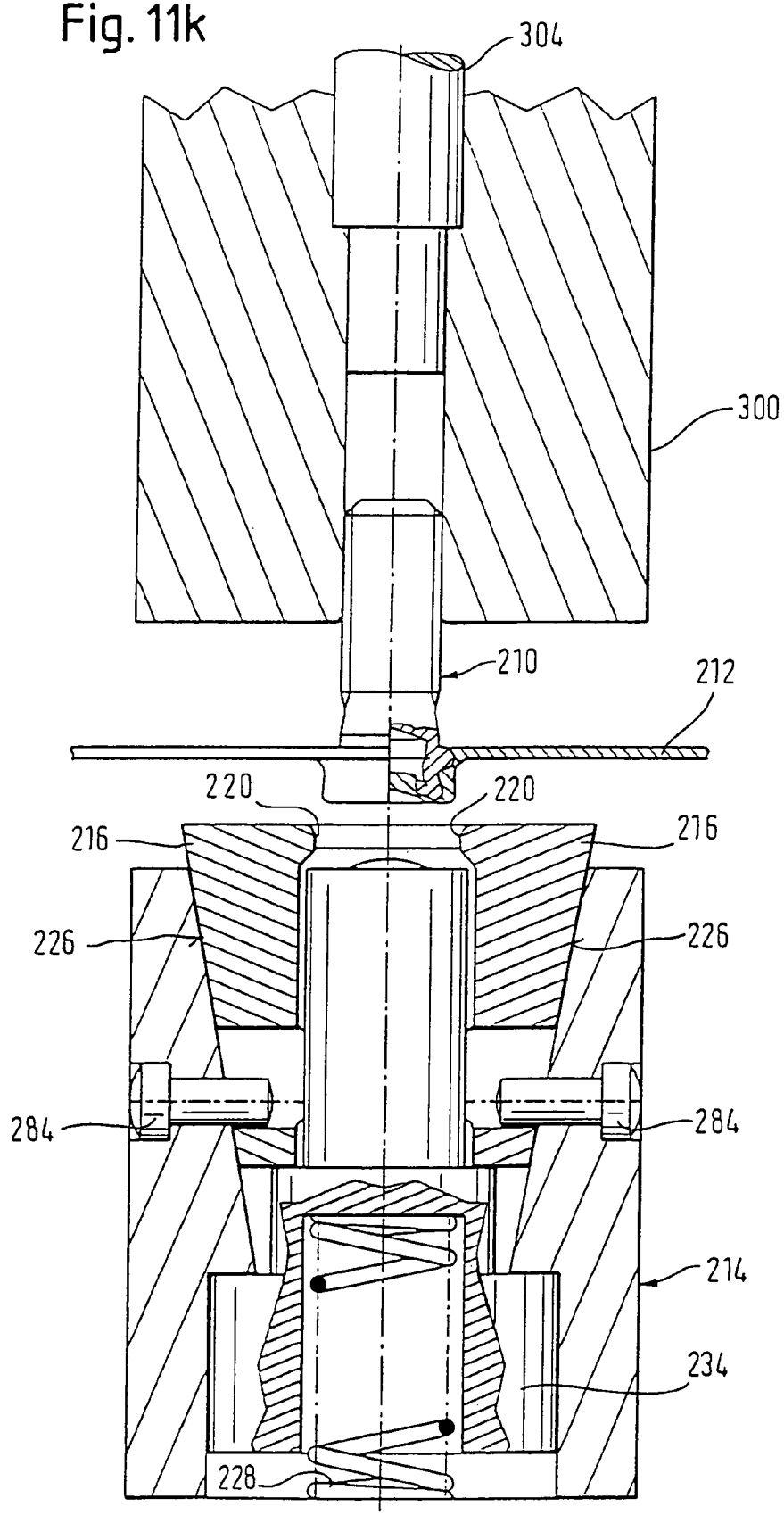

When the state of FIG. 11j has been reached, the press opens and the assembled component (210+212) can now be removed. The shaped parts 216 move upwardly on the opening of the press under the action of the spring 228 so that the open state of the die has been produced again and so that the cycle which has just been described can now be repeated with a new functional element 210 and a new sheet metal part 212. The press is opened sufficiently far that the so formed component assembly, which is shown on its own in FIG. 8 to an enlarged scale, can be removed from the press.

Although the spring 228 is here shown as a compression coil spring it can be replaced by other springs, for example by fluid pressure springs which are well known per se.

Should the functional elements 210 be provided, as mentioned above, with a non-circular cross-section in the region of the head part 210a, for example with a multi-cornered cross-section or with ribs and/or grooves then the method can be carried out in precisely the same manner as described above. The sheet metal material is intimately connected to the outer shape of the head part in a form-fitted manner, whereby an enhanced security against twist-out can be expected. With a design of this kind attention should be paid that the features of shape at the outer side of the head part 210a are not so pronounced that they could damage the sheet metal material in an impermissible manner.

Figure 12A:
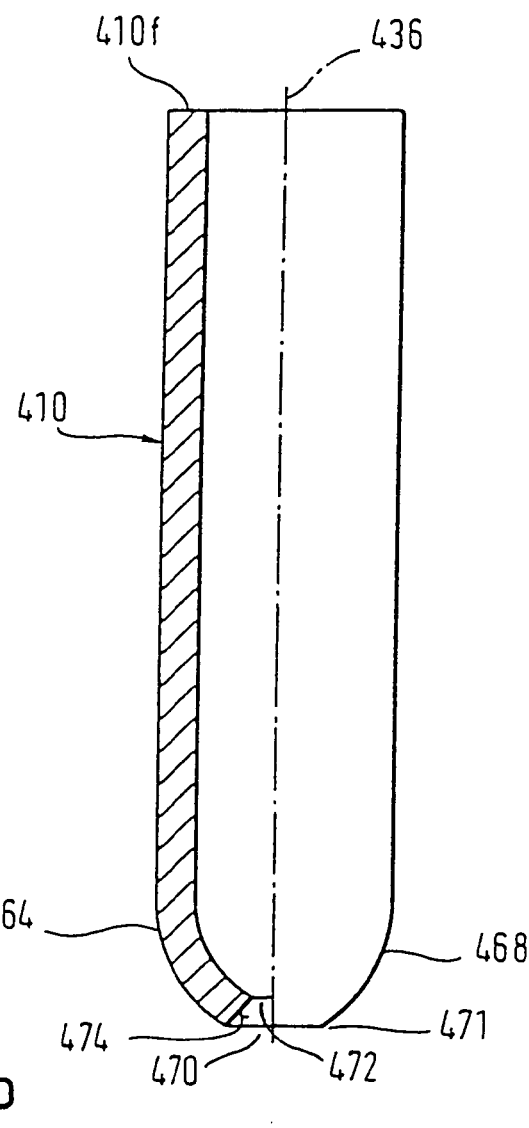

FIG. 12a shows a further example of a functional element which is very similar to the element of FIG. 7. Accordingly the same reference numerals will be used for the description of the element of FIG. 12a and also of further FIG. 12b to 16 as for the FIG. 7 to 11, but increased by the basic number 200 in order to bring about a distinction to the previous figures. The previous description however applies for parts which are now described and have the same last end numbers, un less something different is stated in the following description.

The functional element 410 of FIG. 12a consist of a piece of tube which has the same features of shape at its lower end in FIG. 12a as the element 210 of FIG. 7. Such functional elements can be cut-off in simple manner from a length of tube, with the shaping of the one end for the formation of the end region 464 being produced by simple rolling tools or cold forming processes. In this example the functional element 410 of FIG. 12a has no outer thread, inner thread or other special shape, could however straightforwardly have such features which are associated with a specific, at least in the region of FIG. 12a, function above the region required for deformation for the attachment to the sheet metal part. Also it is not absolutely essential that the thickness remains the same over the full length or that the element is present without steps or shoulders. Such features can be provided as desired. In particular such features can be produced, at least in part, by hydraulic shaping processes at favourable cost using tube material.

Elements in accordance with FIG. 12 can also be attached to a sheet metal part, as previously described in connection with the FIGS. 8 to 11, providing measures are taken in order to avoid undesired deformations of the tubular wall in the upper region, as will later be explained in more detail in connection with FIG. 16.

Figure 12B:
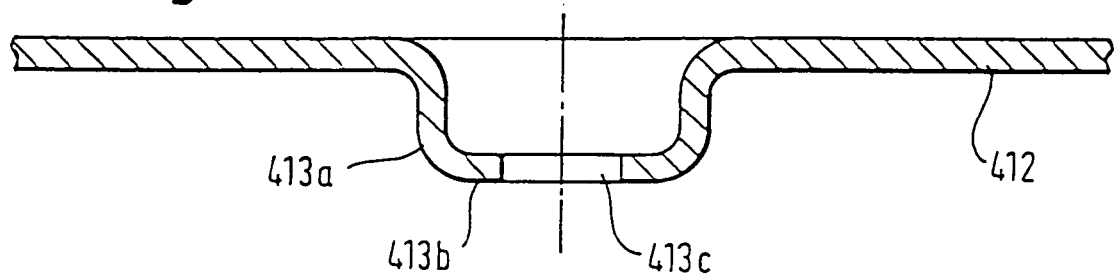

However, the possibility also exists of connecting a functional element such as 410 to a sheet metal part which has undergone a special preparation, as shown in FIG. 12b.

FIG. 12b namely shows a sheet metal part 412 which has been provided with a pot-like recess 413a with a hole 413c provided in the base region 413b in an earlier working process, for example in an earlier station of a progressive die tool set, with the hole shown in FIG. 12b being circular, which also applies to the pot-like recess 413a.

Figure 13:
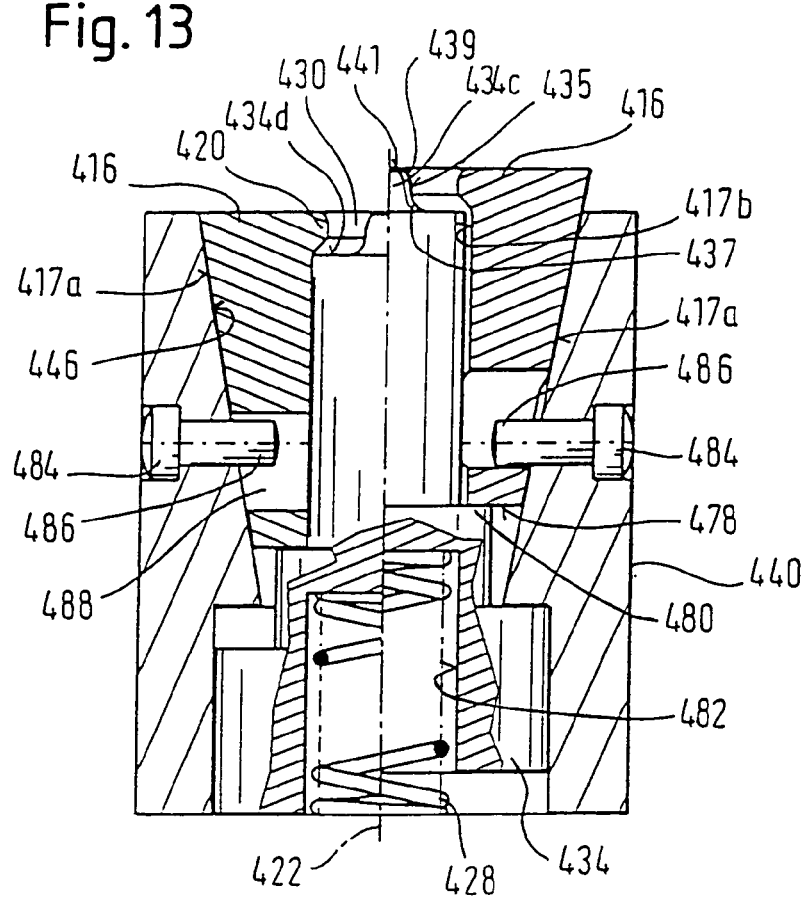
Figure 14:
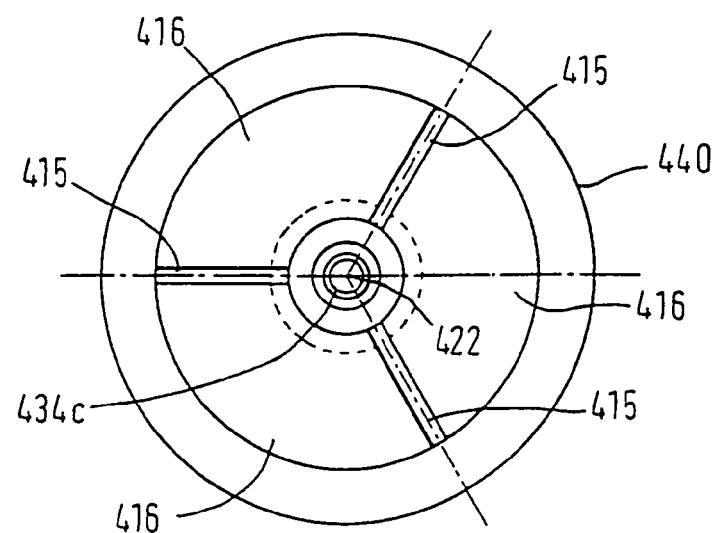

The attachment of the functional element 412 of FIG. 12a to a sheet metal part 412 in accordance with FIG. 12b takes place using a die 414 in accordance with FIGS. 13 and 14 which is identical to the die 214 of FIG. 9 and 10 apart from the formation of the centrally arranged projection 434c.

This projection 434c is provided in the embodiment of FIGS. 13 and 14 with a slightly conical jacket surface 435 which converges slightly upwardly towards the central longitudinal axis 422 in FIG. 13 and merges via radii 437 and 439 into the ring surface 434d, i.e. into the upper circular end face 441 arranged perpendicular to the central longitudinal axis 422. The feature designated as the radius 437 can also have the form of one or more radial noses which, as will be explained in more detail in the following, take care of additional security against rotation in the finished component assembly. These radial noses have in side view the same shape as the radius 437 or obliquely straight upper boundaries which are generally rounded at the edges.

Figure 15:
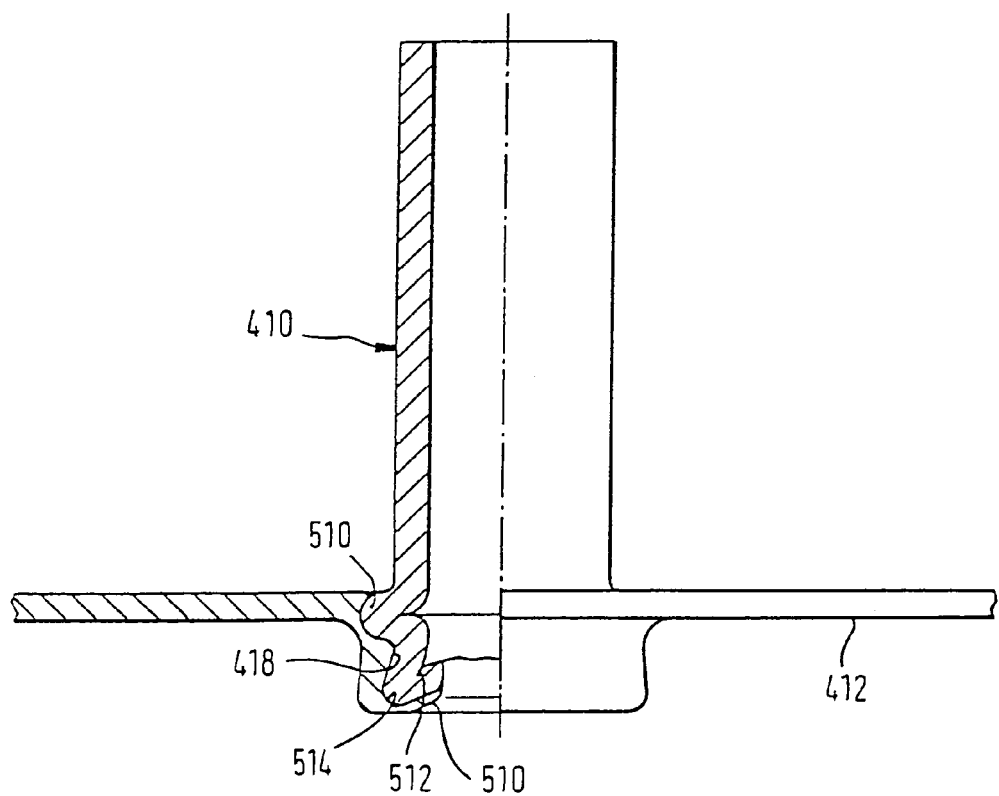
Figure 16:
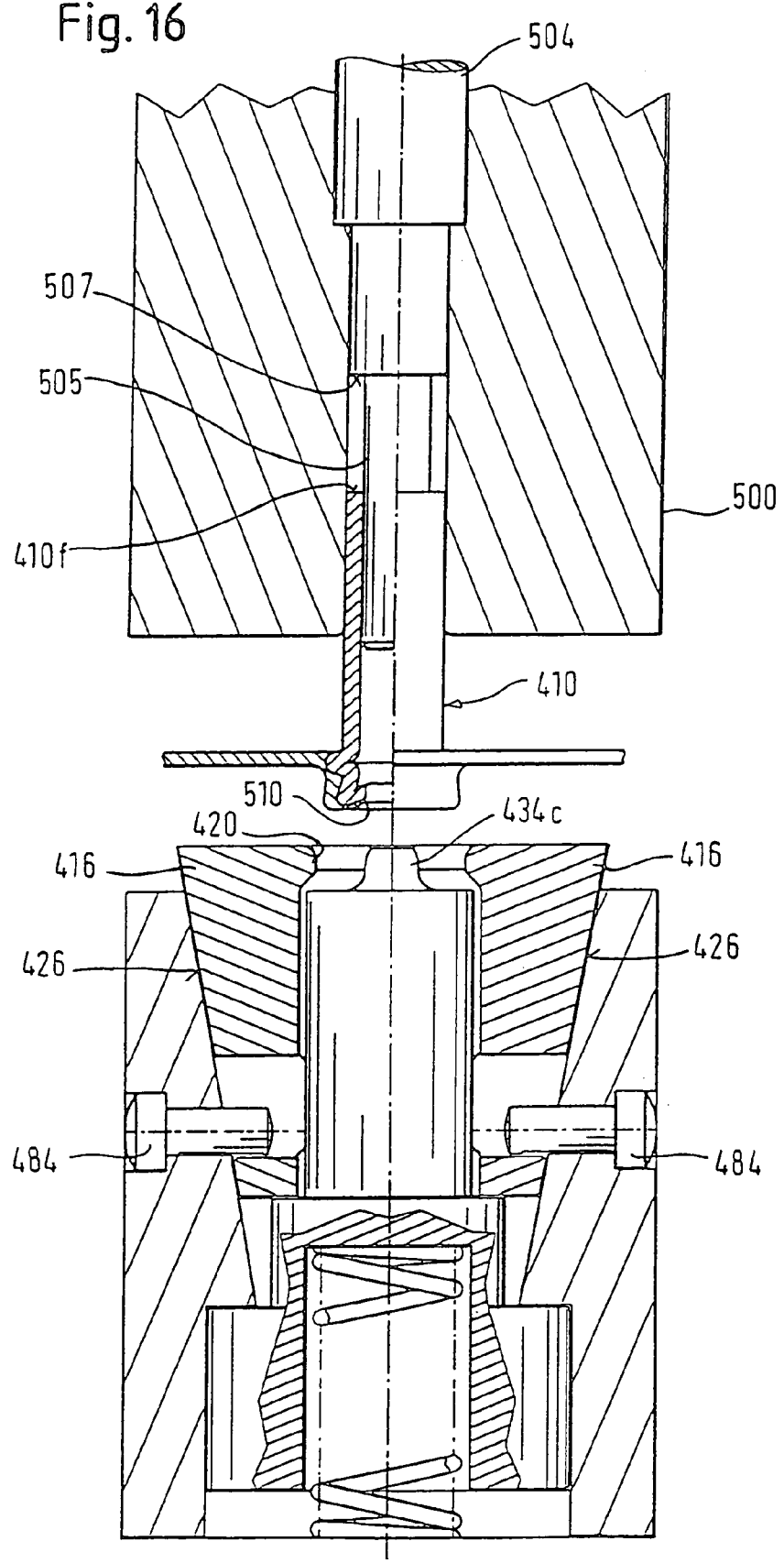

As can be seen from FIGS. 15 and 16, during the attachment process using the die of FIGS. 13 and 14, the lower end of the tubular functional element 410 is shaped precisely as was described in conjunction with FIGS. 11a to k so that a form-fitted connection arises with the sheet metal part 12 in the region of the pot-like recess, with the exception, that in this example the pot-like recess was already preformed. In other respects, in this embodiment, the central projection 434c of the abutment element 434 of the die presses into the hole 413c of the ring-shaped recess 413a and forms a thinned cylindrical lip 510 which projects upwardly into the hollow space of the hollow functional element 410. The slightly conical formation of the projection 434c in the region 435 ensures that the component assembly can be easily removed from the die, i.e. does not remain caught-up in the press. If, as mentioned above, radially extending noses are present instead of the radius 437, in the region of the transition from the projection 434c into the ring-like contact surface 434d, then each such radial nose leads to corresponding radial recesses in the ring-shaped lip 510 and in the neighbouring material of the lower region of the tubular element 410, which further increases the form-fitted connection and above all the security against rotation between the element 410 and the sheet metal part.

FIG. 16 shows in other respects the setting head 500 which is used here for the insertion of the tubular element 410. This setting head 500 corresponds essentially to the setting head 300 in FIG. 11. The plunger 504 has, however, here a cylindrical projection 505 which extends within the tubular element 410 over a considerable length of the same, and indeed down to a point which bounds the intended deformable region of the tubular functional element 410. The wall of the tubular element 401 is namely supported inwardly and outwardly down to this point, at the inside by the cylindrical projection 505 of the plunger 504 and at the outside by the bore of the setting head 500. The forces which are required for the pressing in of the tubular element are transferred from the ring shoulder 507 onto the functional element 410, the ring shoulder 507 namely presses onto the upper end face 410f of the functional element 410 as shown in the Figure.

Finally, the FIGS. 17a to 17e show a possibility of connecting a cylindrical functional element present here in the form of a threaded pin, with a sheet metal part without having to use a die having movable shaped parts, which was the case in the previous embodiments. The threaded pin of FIG. 17 is identical to the threaded pin of FIG. 5, which is why the same reference numerals are used for the threaded pin but increased by the basic number 600. A separate description of the part will be dispensed with, since the description of FIG. 5 and the description of the Figures related to it also apply here.

It should also be pointed out that although the threaded pins 610 is provided here with a thread cylinder 611 a bar-like element without a thread cylinder could also be used, particularly when the latter has radial recesses or raised portions corresponding to the recesses 21 of the element of FIG. 5, so that a form-fitted connection takes place to the sheet metal part in the region of these recesses or raised portions.

FIG. 17a shows the sheet metal part 612 in the starting condition. The sheet metal part is first subjected to a preparation such that it has the shape of FIG. 17b with an inverted pot-like raised portion 613a. By using the setting head 600 of FIG. 17c and a die button 640 with a pot-like recess 641 in accordance with FIG. 17c the lower end of the threaded pin 610 is now connected in form-fitted manner to the sheet metal part 612. It is evident from FIG. 17c that the pot-like recess 641 in the die 614 has a somewhat smaller inner diameter than the outer diameter of the pot-like recess 613a of the sheet metal part.

On closing of the press the setting head 600 moves downwardly. The lower end face of the threaded pin 610 presses the sheet metal part against the die 614 and presses a downwardly directed depression into the inverted pot-like raised form 613*a*, so that the sheet metal part of the inverted pot-like raised portion 613*a* is changed over into a pot-like recess and is simultaneously pressed against the cylindrical outer wall of the threaded pin 610, so that a pot-like recess arises with a form-fitted connection to the threaded pin, as is shown in FIGS. 17*d* and 17*e* at 643.

The setting head 600 preferably also has a ring-shaped nose 645 around the threaded pin with a ring-shaped wedge-like free space 647 between the ring-like nose 645 and the outer diameter of the threaded pin 610. This ring-like nose 645 results, as can be seen from FIGS. 17*d* and 17*e* respectively, in a corresponding ring-shaped recess 649 in the sheet metal part 12 around the threaded pin and leads, as a result of the obliquely set radially inner face of the ring nose 645, to an intimate form-fitted connection of the sheet metal material 651 with the threaded pin radially inside the ring-like recess 649, so that in this region a ring-like collar of the sheet metal material arises around the threaded pin which is connected in form-fitted manner with the threaded pin. That is to say, the oblique radially inner face of the ring nose 645 pushes metal radially inwardly into contact with the threaded pin during the closing of the press.

In all embodiments all materials can be named as the material for the functional elements which achieve strength values of class 8 according to the ISO standard in the context of cold forming, e.g. a 35 B2 alloy in accordance with DIN 1654. The so formed fastener elements or nut elements are suitable for use with all commercially available steel materials for drawn quality sheet metal parts amongst others, as well as for aluminium or its alloys. Aluminium alloys especially high strength aluminium alloys can also be used for the functional elements.

The invention claimed is:

1. A combination of a functional element with a sheet metal part comprising a single continuous piece of sheet metal, said functional element being in the form of a pin having first and second ends, a length, a diameter and a thread formed at said first end and extending along at least a part of said length, said pin diameter being substantially constant along said length between said first and second ends and at said first end, said pin further having features interrupting said thread at said first end, said end being adapted for attachment to said sheet metal part, said sheet metal part having a cylindrical side wall and continuous base, recieving said first end with an end face of said first end contacting said continuos base, material of said sheet metal part being deformed radially inwardly of said thread at said first end and engaging said features, whereby said threaded pin is permanently attached to said sheet metal part and projects beyond said sheet metal part for the attachment of another component thereto.

2. A combination as set forth in claim 1, wherein said features define a groove disposed crosswise through said thread thereby providing anti-rotational properties to said thread.

3. A combination as set forth in claim 1, wherein said features define a rib disposed crosswise through said thread thereby providing anti-rotational properties to said thread.

* * * * *